US008817034B2

(12) United States Patent
Yamakura

(10) Patent No.: US 8,817,034 B2
(45) Date of Patent: Aug. 26, 2014

(54) GRAPHICS RENDERING DEVICE, GRAPHICS RENDERING METHOD, GRAPHICS RENDERING PROGRAM, RECORDING MEDIUM WITH GRAPHICS RENDERING PROGRAM STORED THEREON, INTEGRATED CIRCUIT FOR GRAPHICS RENDERING

(75) Inventor: Makoto Yamakura, Osaka (JP)

(73) Assignee: Panasonic Corporation, Osaka (JP)

(*) Notice: Subject to any disclaimer, the term of this patent is extended or adjusted under 35 U.S.C. 154(b) by 899 days.

(21) Appl. No.: 13/003,352

(22) PCT Filed: May 20, 2010

(86) PCT No.: PCT/JP2010/003410
§ 371 (c)(1),
(2), (4) Date: Jan. 10, 2011

(87) PCT Pub. No.: WO2010/134347
PCT Pub. Date: Nov. 25, 2010

(65) Prior Publication Data
US 2011/0115813 A1    May 19, 2011

(30) Foreign Application Priority Data
May 21, 2009   (JP) .................. 2009-122869

(51) Int. Cl.
*G09G 5/36*      (2006.01)
*G06F 13/372*    (2006.01)
*G06T 11/00*     (2006.01)

(52) U.S. Cl.
CPC ..................................... *G06T 11/00* (2013.01)
USPC .......................................... 345/545; 345/534

(58) Field of Classification Search
CPC ............... G06T 15/30; G06T 2210/22; G06F 12/00–12/16
USPC .................................. 345/533, 534, 545–551
See application file for complete search history.

(56) References Cited

U.S. PATENT DOCUMENTS

| 7,505,036 B1 * | 3/2009 | Baldwin ....................... 345/421 |
| 2007/0211061 A1 | 9/2007 | Kokojima |
| 2010/0002003 A1 * | 1/2010 | Yamauchi ..................... 345/441 |

FOREIGN PATENT DOCUMENTS

| JP | 2005-346605 | 12/2005 |
| JP | 2007-133466 | 5/2007 |
| JP | 2007-241878 | 9/2007 |
| WO | WO 2008114320 A1 * | 9/2008 |

OTHER PUBLICATIONS

International Search Report issued Jun. 29, 2010 in International (PCT) Application No. PCT/JP2010/003410.

* cited by examiner

*Primary Examiner* — Aaron M Richer
(74) *Attorney, Agent, or Firm* — Wenderoth, Lind & Ponack, L.L.P.

(57) ABSTRACT

Provided is a graphics rendering device that includes a frame data generation unit, access pattern setting unit, and frame data writing unit. The frame data generation unit generates, from part of stencil data, a part of frame data composed of a piece of second pixel information corresponding to a predetermined number of pixels in accordance with a first access pattern and an anti-alias pattern used in generating pieces of second pixel information. The access pattern setting unit sets, in accordance with the first access pattern and the anti-alias pattern, a second access pattern indicating pieces of second pixel information accessible by a single access to the frame buffer. The frame data writing unit writes in the frame buffer, when the frame data generation unit has generated a number of pieces of second pixel information indicated by the second access pattern, a part of the frame data corresponding to the number of pieces of second pixel information in accordance with the second access pattern.

11 Claims, 31 Drawing Sheets

G20

G21

G22

Divide into three straight lines

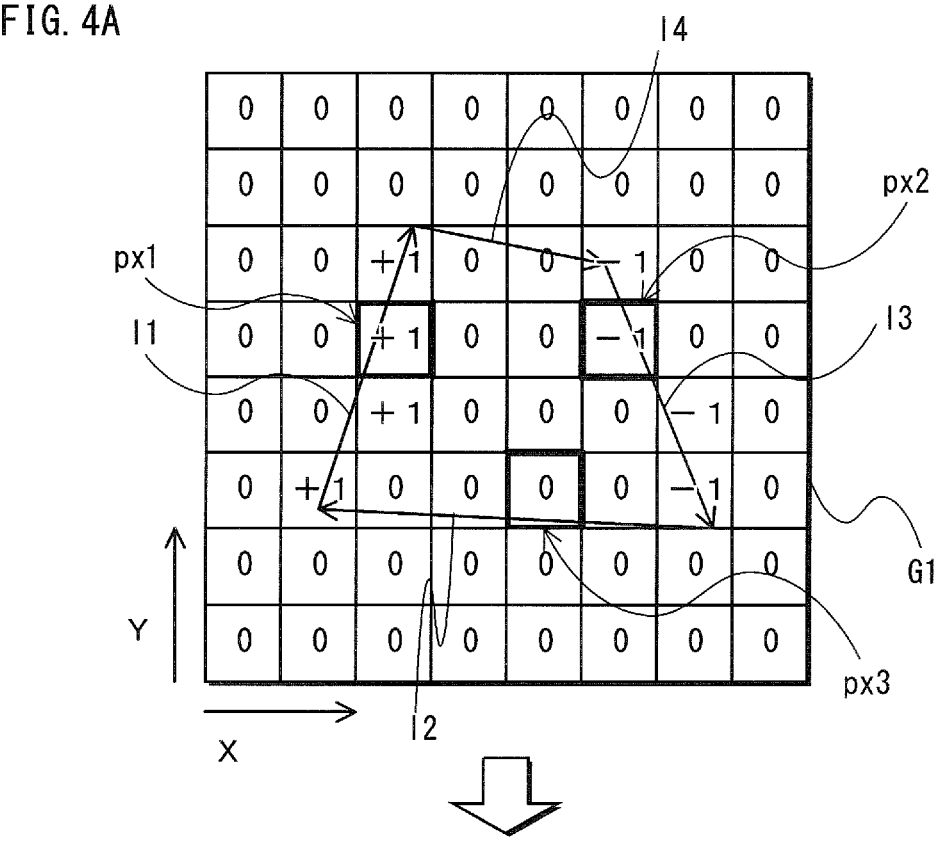

FIG. 5A

| | px61 | px62 | | | | |
|---|---|---|---|---|---|---|
| 0 | 0 | +1 | +1 | +1 | +1 | 0 |
| 0 | +1 | 0 | 0 | 0 | −1 | 0 |
| 0 | 0 | 0 | 0 | 0 | 0 | 0 |
| 0 | 0 | 0 | 0 | 0 | 0 | 0 |

| | px61 | px62 | | | | |
|---|---|---|---|---|---|---|
| 0 | 0 | +1 | +1 | +1 | +1 | 0 |
| 0 | +1 | +1 | 0 | 0 | −1 | 0 |
| 0 | 0 | 0 | 0 | 0 | 0 | 0 |
| 0 | 0 | 0 | 0 | 0 | 0 | 0 |

| | | px62 | px63 | | | |
|---|---|---|---|---|---|---|
| 0 | 0 | +1 | +1 | +1 | +1 | 0 |
| 0 | +1 | +1 | 0 | 0 | −1 | 0 |
| 0 | 0 | 0 | 0 | 0 | 0 | 0 |
| 0 | 0 | 0 | 0 | 0 | 0 | 0 |

| | | px62 | px63 | | | |
|---|---|---|---|---|---|---|
| 0 | 0 | +1 | +1 | +1 | +1 | 0 |
| 0 | +1 | +1 | +1 | 0 | −1 | 0 |
| 0 | 0 | 0 | 0 | 0 | 0 | 0 |
| 0 | 0 | 0 | 0 | 0 | 0 | 0 |

L6, L7, G1

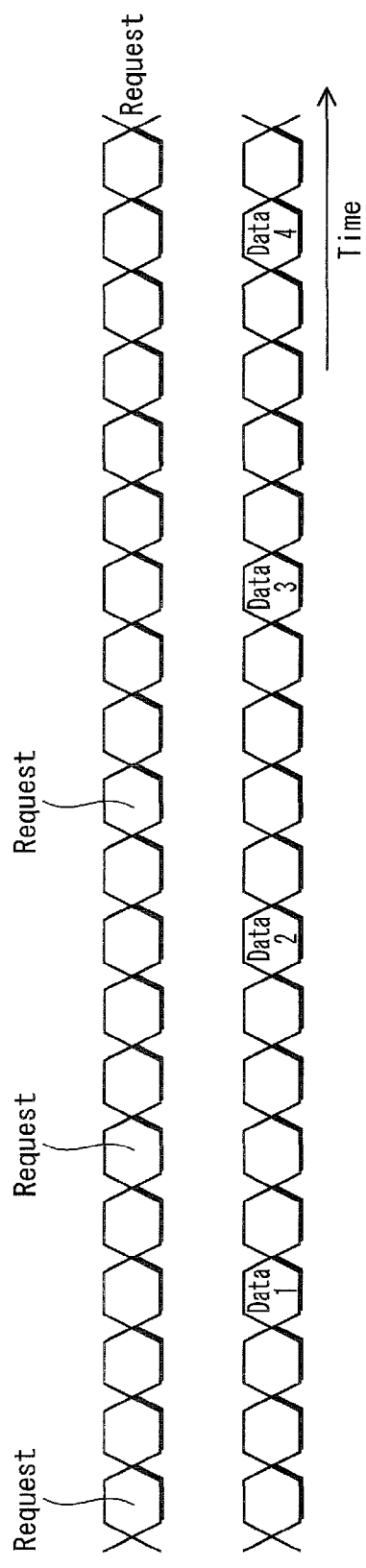

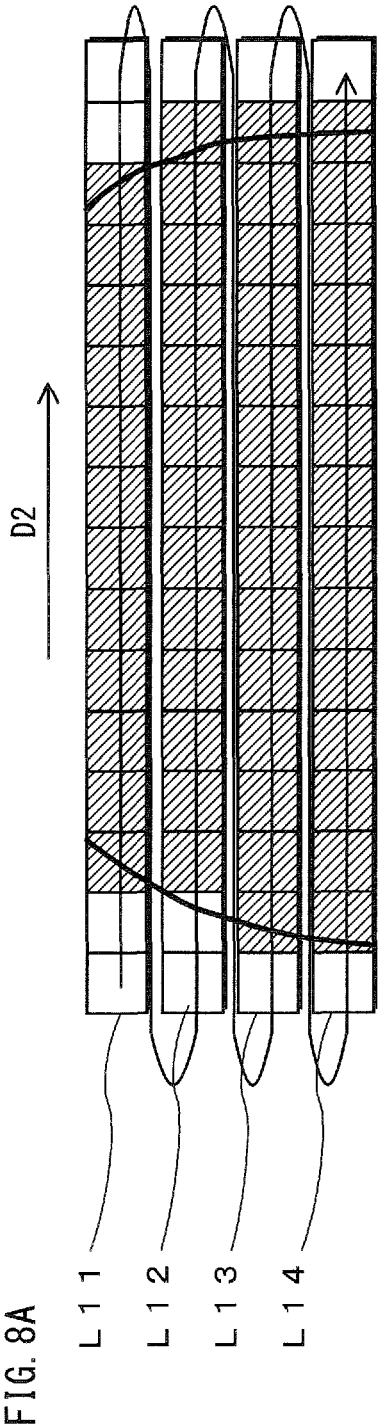
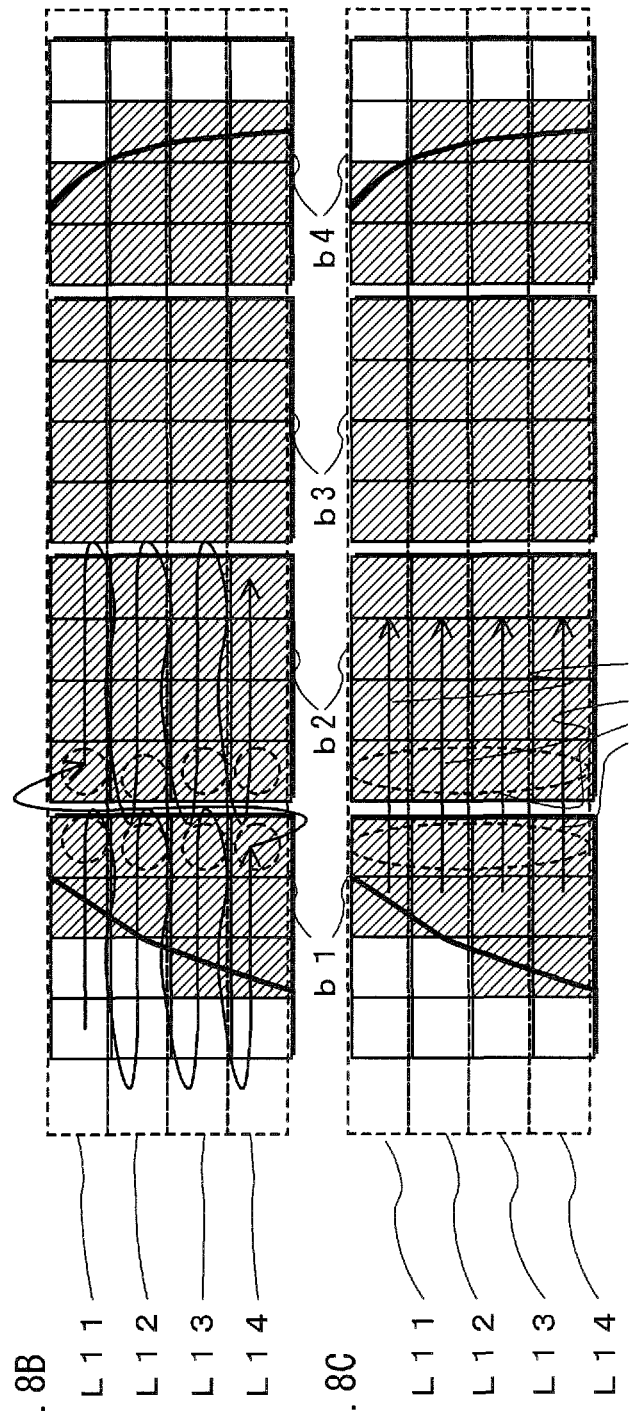

| 0 | 0 | 0  | 0  | 0  | 0  | 0 | 0 |
|---|---|----|----|----|----|---|---|
| 0 | 0 | 0  | 0  | 0  | 0  | 0 | 0 |
| 0 | 0 | +1 | +1 | +1 | 0  | 0 | 0 |
| 0 | 0 | +1 | +1 | +1 | 0  | 0 | 0 |
| 0 | 0 | +1 | +1 | +1 | +1 | 0 | 0 |
| 0 | +1| +1 | +1 | +1 | +1 | 0 | 0 |
| 0 | 0 | 0  | 0  | 0  | 0  | 0 | 0 |
| 0 | 0 | 0  | 0  | 0  | 0  | 0 | 0 |

Calculate coverage values

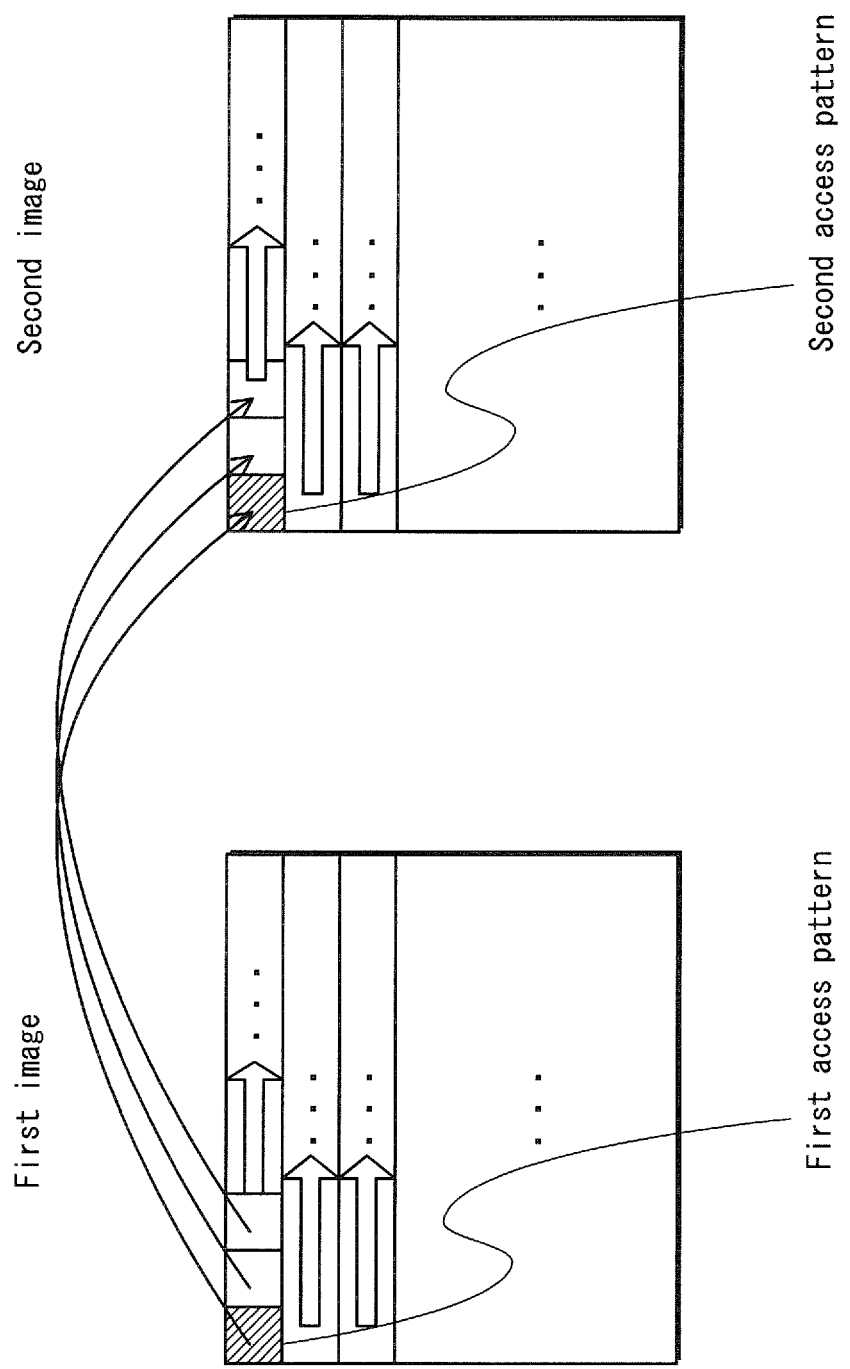

Memory bandwidth: 16 pixels

First access pattern    Second access pattern

FIG. 14A
Anti-alias pattern:
four pixels high
by four pixels wide

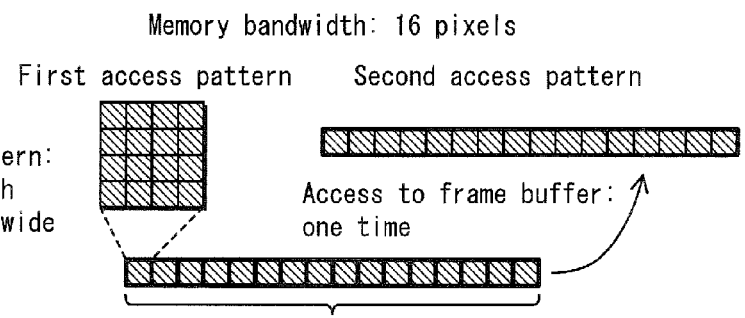

Access to frame buffer: one time

Access to stencil buffer: 16 times

FIG. 14B
Anti-alias pattern:
two pixels high
by four pixels wide

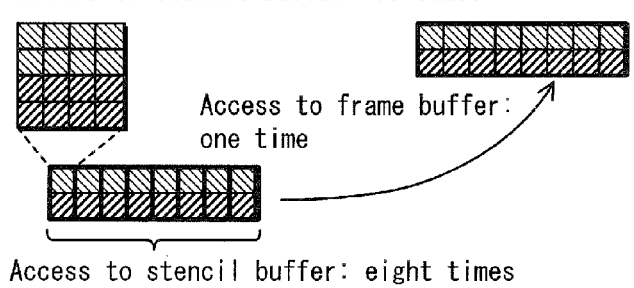

Access to frame buffer: one time

Access to stencil buffer: eight times

FIG. 14C
Anti-alias pattern:
four pixels high
by two pixels wide

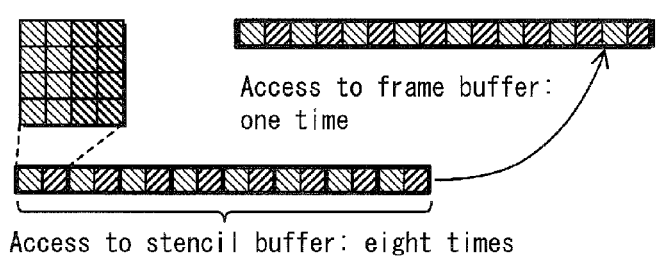

Access to frame buffer: one time

Access to stencil buffer: eight times

FIG. 14D
Anti-alias pattern:
two pixels high
by two pixels wide

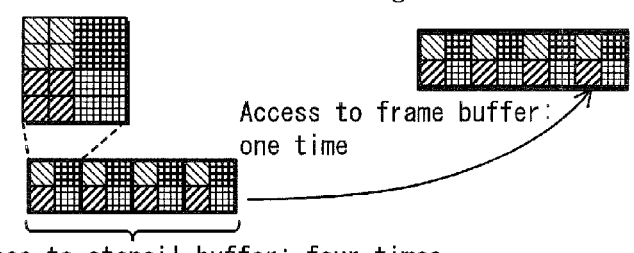

Access to frame buffer: one time

Access to stencil buffer: four times

FIG. 14E
Anti-alias pattern:
one pixel high
by one pixel wide

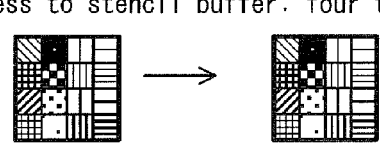

Access to stencil buffer: one time    Access to frame buffer: one time

FIG. 24A

First access pattern    Second access pattern

Anti-alias pattern:
four pixels high
by four pixels wide

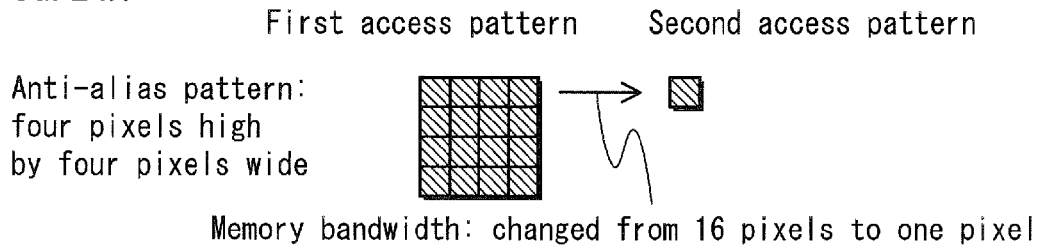

Memory bandwidth: changed from 16 pixels to one pixel

FIG. 24B

Anti-alias pattern:
two pixels high
by four pixels wide

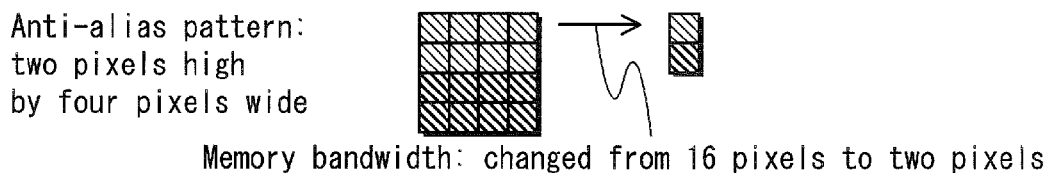

Memory bandwidth: changed from 16 pixels to two pixels

FIG. 24C

Anti-alias pattern:
four pixels high
by two pixels wide

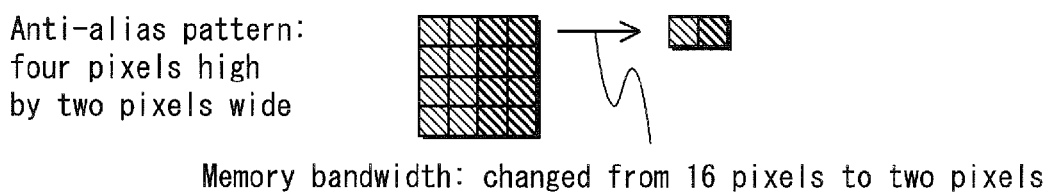

Memory bandwidth: changed from 16 pixels to two pixels

FIG. 24D

Anti-alias pattern:
two pixels high
by two pixels wide

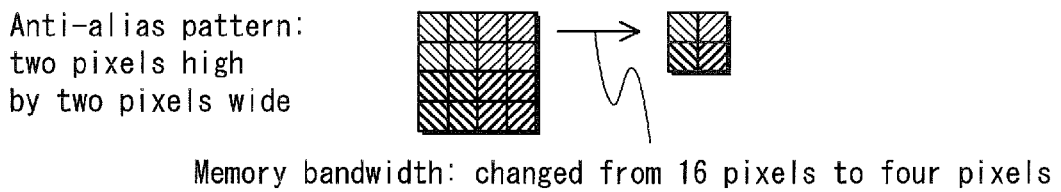

Memory bandwidth: changed from 16 pixels to four pixels

FIG. 24E

Anti-alias pattern:
one pixel high
by one pixel wide

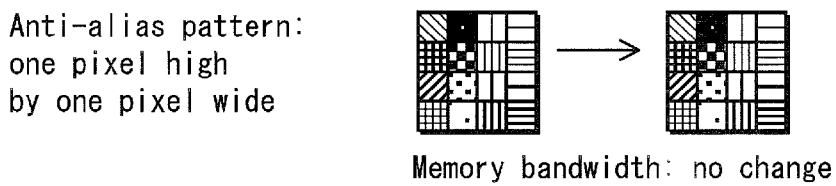

Memory bandwidth: no change

FIG. 27

| ID# | First access pattern | Anti-alias pattern | Second access pattern |
|---|---|---|---|
| ID1 | Eight pixels high by eight pixels wide | Four pixels high by four pixels wide | Two pixels high by 32 pixels wide |
| ID2 | Four pixels high by four pixels wide | Four pixels high by four pixels wide | One pixel high by 16 pixels wide |
| ID3 | Four pixels high by four pixels wide | Two pixels high by four pixels wide | Two pixels high by eight pixels wide |
| ID4 | Four pixels high by four pixels wide | Four pixels high by two pixels wide | One pixel high by 16 pixels wide |
| ID5 | Four pixels high by four pixels wide | Two pixels high by two pixels wide | Two pixels high by eight pixels wide |
| ... | | ..... | |
| IDn | 16 pixels high by 16 pixels wide | Two pixels high by two pixels wide | Eight pixels high by 32 pixels wide |

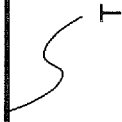

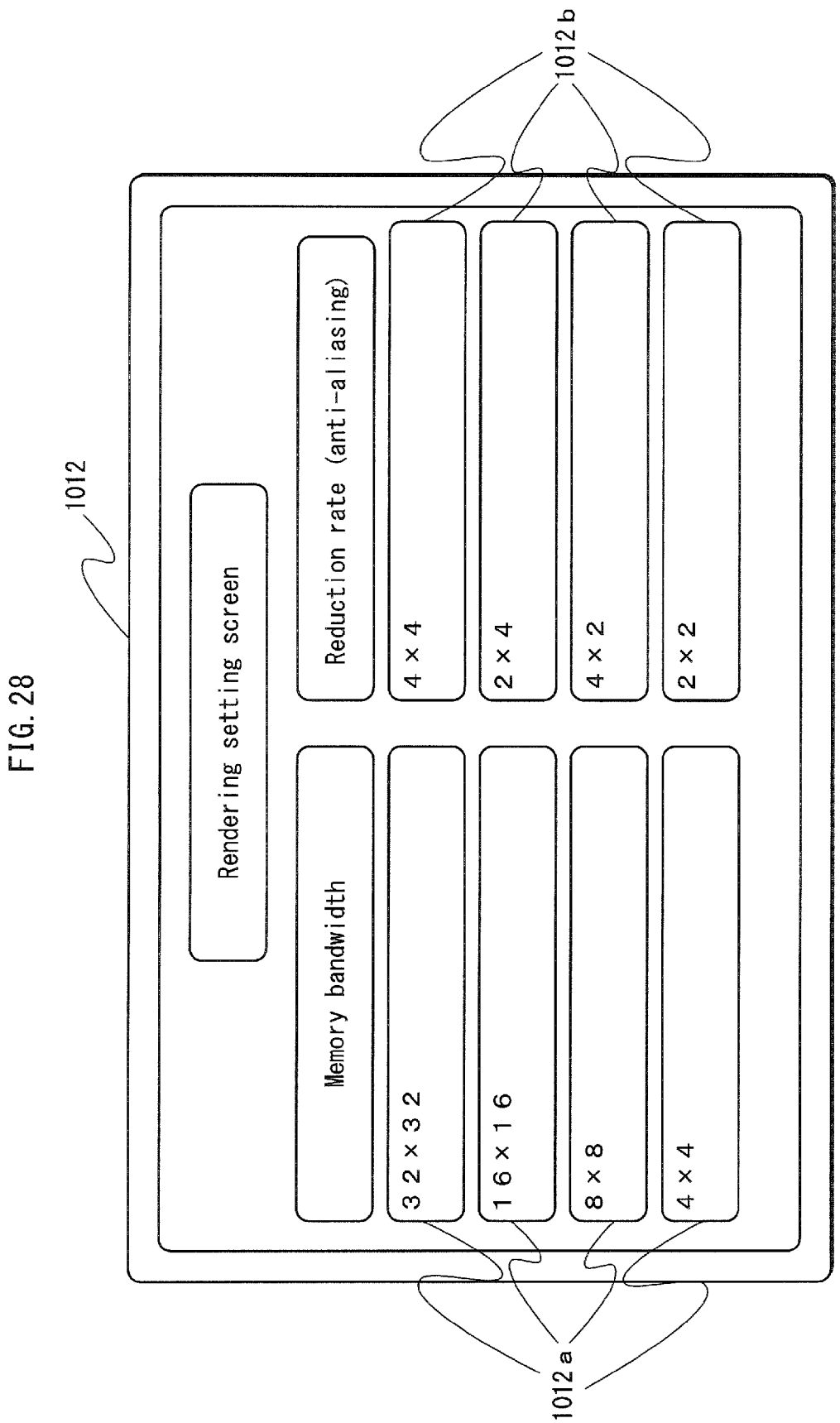

G1   SH1

SH1

G2

SH2

SH1

G3

SH2

G1   SH1

SH1

G2

SH2

SH1

G3

SH2

Memory bandwidth: 16 pixels

US 8,817,034 B2

GRAPHICS RENDERING DEVICE, GRAPHICS RENDERING METHOD, GRAPHICS RENDERING PROGRAM, RECORDING MEDIUM WITH GRAPHICS RENDERING PROGRAM STORED THEREON, INTEGRATED CIRCUIT FOR GRAPHICS RENDERING

TECHNICAL FIELD

The present invention relates to anti-aliasing in graphics rendering.

BACKGROUND ART

For conversion of images that have been rasterized at a high resolution into low-resolution images, a rendering device that improves image quality of vector graphics by performing anti-aliasing via filtering has conventionally been proposed.

Such proposed rendering devices include, for example, the rendering device recited in Patent Literature 1. From (i) stencil data that represents a first image G1 that includes a 2D shape SH1 generated from vector data and stored in a stencil data storage unit, and (ii) coverage data indicating alpha values of pixels located near the edge of the 2D shape SH1, as shown in FIG. 29A, the rendering device recited in Patent Literature 1 generates raster data representing a second image G2, which includes a 2D shape SH2 and is a higher resolution than the first image G1, as shown in FIG. 29B, and stores the second image G2 in a raster data storage unit. Next, after synthesizing pieces of raster data that represent a plurality of 2D shapes SH1 and SH2 stored in the raster data storage unit, the rendering device converts the data obtained by combination into data representing a third image G3, which includes the 2D shapes SH1 and SH2 and is a lower resolution than the second image G2, as shown in FIG. 29C, and displays the third image G3 on a display unit such as a display.

However, in the rendering device recited in Patent Literature 1, it is difficult to prevent an increase in required memory storage capacity since it is necessary to store raster data representing a second image G2, which includes high-resolution 2D shapes SH1 and SH2, in the raster data storage unit, causing the storage capacity of the memory composing the raster data storage unit to grow large. It is also difficult to prevent an increase in the number of memories, since it is also necessary to provide a separate coverage data storage unit to store coverage data.

To address these problems, another rending device has been proposed, the rendering device being provided with a stencil buffer storing stencil data corresponding to the first image G1, a frame buffer storing raster data (frame data) corresponding to the second image G2, a display that displays the third image G3, and a processing device that achieves functions such as generating stencil data and frame data by executing appropriate programs. As shown in FIGS. 30A-30C, this rendering device sets the resolution of the second image G2 to be the same as the third image G3 and sets the resolution of the first image G1 to be higher than the resolution of the second image G2.

In this rendering device, when the 2D shape SH1 is rendered on the second image G2, the image quality of vector graphics is improved by setting color values so as to blur the color of pixels at the edge of the 2D shape SH1 based on an anti-alias pattern. For example, if the anti-alias pattern is set in the first image G1 to four pixels high by four pixels wide, one pixel of frame data in the second image G2 is generated from stencil data in the first image G1 that is four pixels high by four pixels wide.

This rendering device includes a processing device that has an internal processor and main storage device, and when stencil data or frame data is generated, data is transferred between the processing device and the stencil buffer or frame buffer. However, in order to improve processing speed, data transfer between the processing device and the stencil buffer or frame buffer is performed via a method such as burst transfer, which transfers a predetermined data amount (hereinafter referred to as "memory bandwidth") for one access request. In the example in FIG. 31A, for each request to access the stencil buffer, the processing device accesses four pixels high by four pixels wide of stencil data for the first image A in the stencil buffer.

CITATION LIST

Patent Literature

Patent Literature 1: Japanese Patent Application Publication No. 2007-241878

SUMMARY OF INVENTION

Technical Problem

The following problems, however, are noted. In the example shown in FIG. 31A, a first access pattern and anti-alias pattern are both set to four pixels high by four pixels wide in the first image G1. The processing device is set to write four pixels high by four pixels wide of frame data of the second image G2 in the frame buffer (hereinafter referred to as the "second access pattern") for every four requests to access the stencil buffer. In this case, even though only one pixel high by four pixels wide of frame data of the second image G2 has been generated, the processing device accesses a storage region for storing 16 pixels of frame data of the second image G2. Accordingly, access to the frame buffer for the remaining three pixels high by four pixels wide of frame data included in the second access pattern is wasted.

In the example shown in FIG. 31B, only the anti-alias pattern is changed to two pixels high by four pixels wide, and the processing device is set to write four pixels high by four pixels wide of frame data of the second image G2 in the frame buffer for every four requests to access the stencil buffer. In this case, even though only two pixels high by four pixels wide of frame data of the second image G2 has been generated, the processing device accesses a storage region for storing 16 pixels of frame data of the second image G2. Accordingly, access to the frame buffer for the remaining two pixels high by four pixels wide of frame data included in the second access pattern is wasted.

The present invention has been conceived by taking the above reasons into consideration, and it is an object thereof to improve efficiency of access to the frame buffer.

Solution to Problem

In order to resolve the above problems, a graphics rendering device according to the present invention is provided with a stencil buffer storing stencil data including pieces of first pixel information, one for each pixel in a first image, a frame buffer storing frame data composed of pieces of second pixel information, one for each pixel in a second image of a lower resolution than the first image, and a rendering unit for rendering the frame data on a display, the graphics rendering device comprising: a stencil data read unit operable to access the stencil buffer one or more times to read a part of the stencil data in accordance with a first access pattern indicating pieces of first pixel information accessible by a single access to the stencil buffer; a frame data generation unit operable to generate, from the part of the stencil data, a part of the frame data composed of a piece of second pixel information corresponding to a predetermined number of pixels in accordance with the first access pattern and an anti-alias pattern used in generating the pieces of second pixel information; an access pattern setting unit operable to set, in accordance with the first access pattern and the anti-alias pattern, a second access pattern indicating pieces of second pixel information accessible by a single access to the frame buffer; and a frame data writing unit operable, when the frame data generation unit has generated pieces of second pixel information as indicated by the second access pattern, to write, in the frame buffer, a part of the frame data corresponding to the pieces of second pixel information in accordance with the second access pattern.

Advantageous Effects of Invention

In the graphics rendering device with the above structure, since it is possible to prevent wasted access to the frame buffer by the access pattern setting unit appropriately setting the second access pattern in accordance with the first access pattern and the anti-alias pattern. Consequently, a reduction in efficiency of access to the frame buffer is prevented.

In the graphics rendering device with the above structure, the first access pattern may be A pixels in a vertical direction and B pixels in a horizontal direction, where A and B are each an integer two or greater.

In the graphics rendering device with the above structure, A may be $2N \times P$, and B may be $2K \times Q$, where N, P, K, and Q are each an integer one or greater. The anti-alias pattern may be 2M pixels in a vertical direction and 2J pixels in a horizontal direction, where M and J are each an integer one or greater, one of M and J is two or greater, $N \geq M$, and $K \geq J$. The second access pattern may be $(2N-M) \times P \times R$ pixels in a vertical direction and $(2K-J) \times Q \times S$ pixels in a horizontal direction, where R and S are each an integer one or greater.

In the graphics rendering device with the above structure, the most appropriate second access pattern from the standpoint of improving efficiency of access to the frame buffer is determined from the first access pattern and the anti-alias pattern.

In the graphics rendering device with the above structure, P and Q may each be one. R may be one, and S may be 2J+M.

In the graphics rendering device with the above structure, the stencil data read unit accesses the stencil buffer by moving the first access pattern horizontally across the first image and the frame data writing unit accesses the stencil buffer by moving the second access pattern horizontally across the second image. An increase in efficiency of access is achieved while specifying the relationship between the size of the part of the stencil data accessed each time and the size of the frame data accessed each time. Therefore, control to change the amount of data transferred when accessing the frame buffer one time in accordance with the amount of data transferred when accessing the stencil buffer one time becomes unnecessary, which simplifies control.

In the graphics rendering device with the above structure, P and Q may each be one. R may be 2M+J, and S may be one.

In the graphics rendering device with the above structure, the stencil data read unit accesses the stencil buffer by moving the first access pattern vertically across the first image and the frame data writing unit accesses the stencil buffer by moving the second access pattern vertically across the second image. An increase in efficiency of access is achieved while specifying the relationship between the size of data read when accessing the stencil buffer one time and the size of data written when accessing the frame buffer one time. Therefore, control to change the amount of data accessed when accessing the frame buffer one time in accordance with the amount of data transferred when accessing the stencil buffer one time becomes unnecessary, which simplifies control.

In the graphics rendering device with the above structure, P, Q, R, and S may each be one.

In the graphics rendering device with the above structure, the size of frame data accessed each time by the frame data writing unit is reduced, which improves processing speed.

In the graphics rendering device with the above structure, the access pattern setting unit may set a number of accesses to the stencil buffer for a single access to the frame buffer in accordance with the first access pattern, the anti-alias pattern, and the second access pattern.

In the graphics rendering device with the above structure, the access pattern setting unit sets the number of accesses to the stencil buffer for one access to the frame buffer in accordance with the first access pattern, the anti-alias pattern, and the second access pattern, which improves efficiency of access to the frame buffer.

The graphics rendering device with the above structure may further comprise a pattern storage unit storing the anti-alias pattern.

In the graphics rendering device with the above structure, changes in the anti-alias pattern are handled simply by storing anti-alias patterns beforehand in the pattern storage unit. Therefore, a reduction in efficiency of access caused by a change in the anti-alias pattern is controlled.

The above structure may be a graphics rendering method implemented by a computer, the graphics rendering method comprising the steps of: storing, in a stencil buffer, stencil data composed of pieces of first pixel information, one for each pixel in a first image; storing, in a frame buffer, frame data composed of pieces of second pixel information, one for each pixel in a second image of a lower resolution than the first image; reading, by accessing the stencil buffer one or more times, a part of the stencil data in accordance with a first access pattern indicating pieces of first pixel information accessible by a single access to the stencil buffer; generating, from the part of the stencil data, a part of the frame data composed of a piece of second pixel information corresponding to a predetermined number of pixels in accordance with the first access pattern and an anti-alias pattern used in generating the pieces of second pixel information; setting, in accordance with the first access pattern and the anti-alias pattern, a second access pattern indicating pieces of second pixel information accessible by a single access to the stencil buffer; writing in the frame buffer, when pieces of second pixel information as indicated by the second access pattern have been generated, a part of the frame data corresponding to the pieces of second pixel information in accordance with the second access pattern; and rendering the frame data on a display.

The above structure may be a graphics rendering program that causes a computer to perform graphics rendering, the graphics rendering comprising the steps of: storing, in a stencil buffer, stencil data composed of pieces of first pixel information, one for each pixel in a first image; storing, in a frame buffer, frame data composed of pieces of second pixel information, one for each pixel in a second image of a lower resolution than the first image; reading, by accessing the stencil buffer one or more times, a part of the stencil data in accordance with a first access pattern indicating pieces of first pixel information accessible by a single access to the stencil buffer; generating, from the part of the stencil data, a part of the frame data composed of a piece of second pixel information corresponding to a predetermined number of pixels in accordance with the first access pattern and an anti-alias pattern used in generating the pieces of second pixel information; setting, in accordance with the first access pattern and the anti-alias pattern, a second access pattern indicating pieces of second pixel information accessible by a single access to the stencil buffer; writing in the frame buffer, when pieces of second pixel information as indicated by the second access pattern have been generated, a part of the frame data corresponding to the pieces of second pixel information in accordance with the second access pattern; and rendering the frame data on a display.

The above structure may be a recording medium having recorded thereon a graphics rendering program that causes a computer to perform graphics rendering, the graphics rendering comprising the steps of: storing, in a stencil buffer, stencil data composed of pieces of first pixel information, one for each pixel in a first image; storing, in a frame buffer, frame data composed of pieces of second pixel information, one for each pixel in a second image of a lower resolution than the first image; reading, by accessing the stencil buffer one or more times, a part of the stencil data in accordance with a first access pattern indicating pieces of first pixel information accessible by a single access to the stencil buffer; generating, from the part of the stencil data, a part of the frame data composed of a piece of second pixel information corresponding to a predetermined number of pixels in accordance with the first access pattern and an anti-alias pattern used in generating the pieces of second pixel information; setting, in accordance with the first access pattern and the anti-alias pattern, a second access pattern indicating pieces of second pixel information accessible by a single access to the stencil buffer; writing in the frame buffer, when pieces of second pixel information as indicated by the second access pattern have been generated, a part of the frame data corresponding to the pieces of second pixel information in accordance with the second access pattern; and rendering the frame data on a display.

The above structure may be an integrated circuit for graphics rendering provided with a stencil buffer storing stencil data including pieces of first pixel information, one for each pixel in a first image, a frame buffer storing frame data composed of pieces of second pixel information, one for each pixel in a second image of a lower resolution than the first image, and a rendering unit for rendering the frame data on a display, the integrated circuit comprising: a stencil data read unit operable to access the stencil buffer one or more times to read a part of the stencil data in accordance with a first access pattern indicating pieces of first pixel information accessible by a single access to the stencil buffer; a frame data generation unit operable to generate, from the part of the stencil data, a part of the frame data composed of a piece of second pixel information corresponding to a predetermined number of pixels in accordance with the first access pattern and an anti-alias pattern used in generating the pieces of second pixel information; an access pattern setting unit operable to set, in accordance with the first access pattern and the anti-alias pattern, a second access pattern indicating pieces of second pixel information accessible by a single access to the frame buffer; and a frame data writing unit operable, when the frame data generation unit has generated pieces of second pixel information as indicated by the second access pattern, to write, in the frame buffer, a part of the frame data corresponding to the pieces of second pixel information in accordance with the second access pattern.

The graphics rendering integrated circuit with the above structure achieves a reduction in size.

BRIEF DESCRIPTION OF DRAWINGS

FIGS. 4A and 4B illustrate edge processing and filling in Embodiment 1.

FIGS. 5A, 5B, 5C, and 5D illustrate edge filling in Embodiment 1.

FIGS. 6A and 6B illustrate a method of accessing a stencil buffer and a frame buffer in Embodiment 1.

FIGS. 8A, 8B, and 8C illustrate operations of a filling unit in Embodiment 1.

FIG. 10 illustrates operations to access the stencil buffer and the frame buffer in Embodiment 1.

FIGS. 14A, 14B, 14C, 14D, and 14E illustrate operations of the access pattern setting unit in Embodiment 1.

FIGS. 24A, 24B, 24C, 24D, and 24E illustrate operations of the access pattern setting unit in Embodiment 3.

FIG. 27 is a conceptual diagram showing a pattern management table used in a Modification.

FIG. 28 is a front view of the pattern input unit (touch screen) in a Modification.

DESCRIPTION OF EMBODIMENTS

<Embodiment 1>
<1> Outline

Figure 1A:
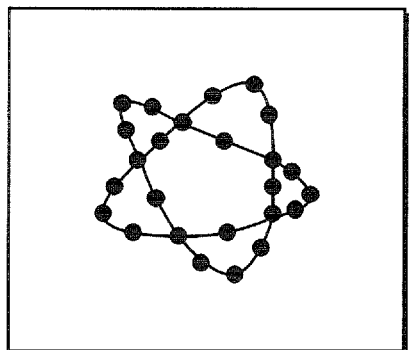
FIGS. 1A, 1B, and 1C outline operations by a graphics rendering device in Embodiment 1.
Figure 1B:
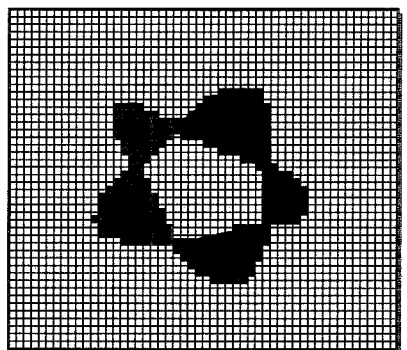
Figure 1C:
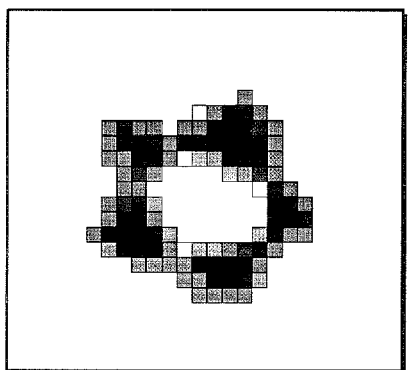

A graphics rendering device 1000 according to Embodiment 1 for example generates a high-resolution raster image G21, as shown in FIG. 1B, from vector data composed of coordinate data for a plurality of points on an outline of a vector image G20, as shown in FIG. 1A. By converting the resolution of the raster image G21, the graphics rendering device 1000 then generates a raster image G22, having a lower resolution than the raster image G21, as shown in FIG. 1C. Hereinafter, a high-resolution raster image generated from vector data representing a vector image is referred to as a first image, and a lower resolution raster image generated by converting the resolution of the first image is referred to as a second image.

<2> Structure

Figure 2:
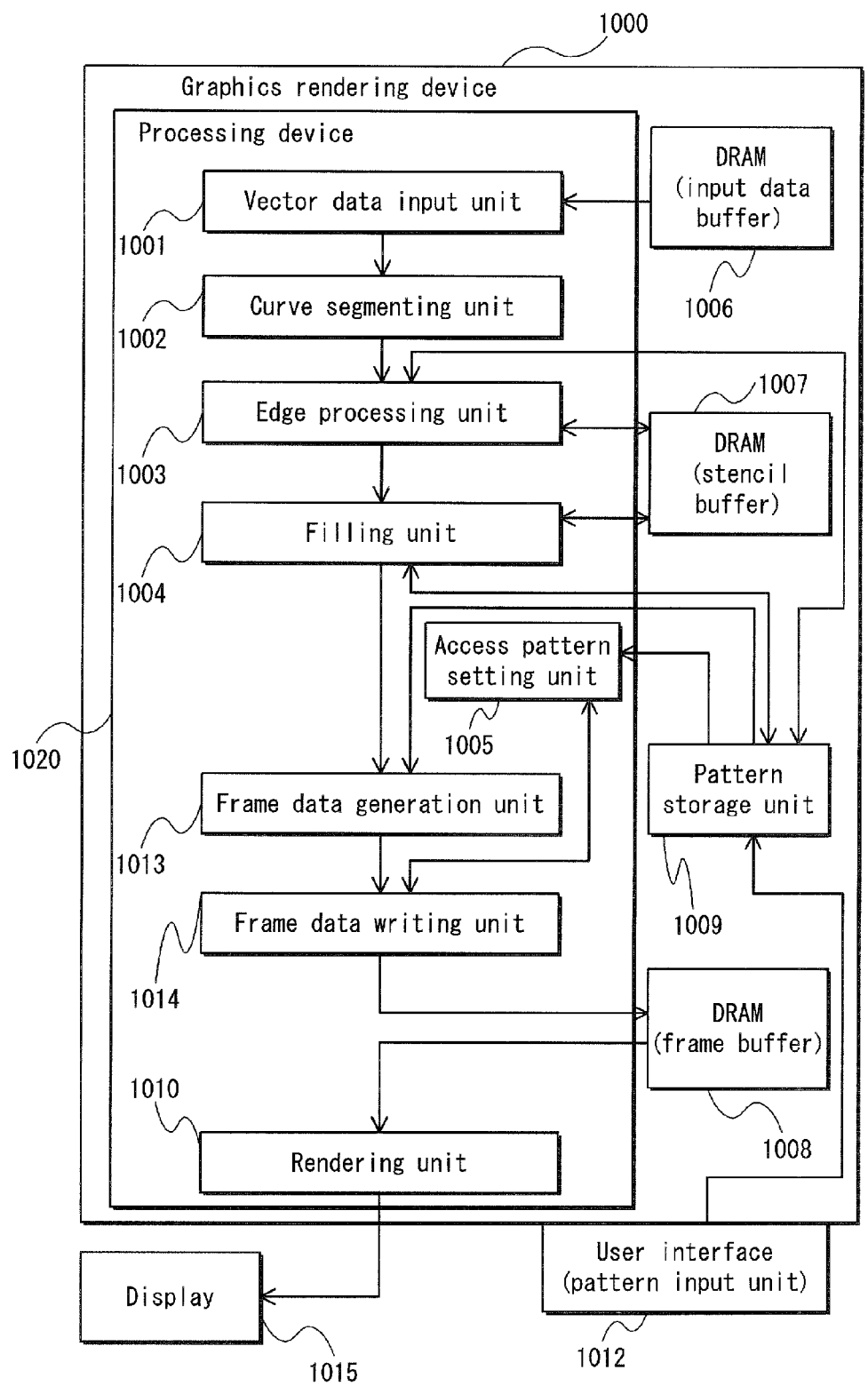
FIG. 2 is a block diagram showing a structure of the graphics rendering device in Embodiment 1.

FIG. 2 shows a structure of the graphics rendering device 1000 in Embodiment 1.

The graphics rendering device 1000 is provided with a stencil buffer 1007, frame buffer 1008, input data buffer 1006, processing device 1020 that includes a processor (not shown in the figures) and a main storage device (not shown in the figures), pattern storage unit 1009, and pattern input unit 1012.

The processing device 1020 executes appropriate programs to implement a vector data input unit 1001, curve segmenting unit 1002, edge processing unit 1003, filling unit 1004 that is a stencil data read unit, frame data generation unit 1013, frame data writing unit 1014, access pattern setting unit 1005, and rendering unit 1010.

<2-1> Buffer

Figure 3A:
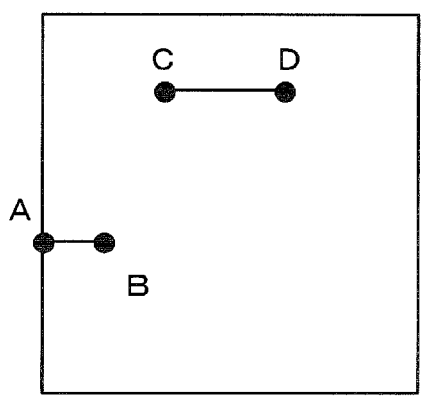
FIGS. 3A, 3B, and 3C illustrate vector data used in Embodiment 1.
Figure 3B:
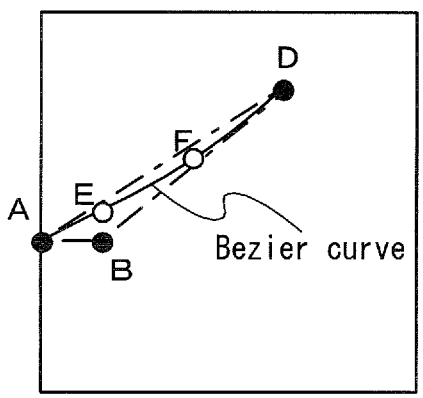

The input data buffer 1006 stores vector data representing 2D shapes or the like. In this context, vector data indicates a vector image composed of straight lines and curves, as shown in FIGS. 3A and 3B. Vector data that represents a vector image that has been enlarged, at a ratio of the resolution of the first image to the resolution of the second image, is also stored in the input data buffer 1006.

The stencil buffer 1007 is composed of Dynamic Random Access Memory (DRAM). A plurality of pieces of first pixel information composing the first image are stored in the stencil buffer 1007. Each piece of first pixel information is the size of the number of bits per pixel and is composed of numerical data indicating either 0 or a predetermined value other than 0. (In Embodiment 1, the values are "+1" or "−1" and are referred to hereinafter as "stencil values".) The first image indicates, for example, one character and is set to a higher resolution than an image actually rendered on the display 1015.

The frame buffer 1008 is composed of DRAM. Pieces of second pixel information corresponding to pixels composing the second image are stored in the frame buffer 1008. Each piece of second pixel information is the size of the number of bits per pixel and is composed of color value data on the corresponding pixel. The second image is set to the same resolution as an image actually rendered on the display 1015.

A piece of second pixel information is calculated by performing filtering, such as averaging, on a plurality of pieces of first pixel information corresponding to the piece of second pixel information. Accordingly, the way in which the plurality of pieces of first pixel information corresponding to the piece of second pixel information are selected influences the effect of anti-aliasing.

In this context, a pattern composed of a plurality of pixels that are the target of filtering such as averaging is typically referred to as an anti-alias pattern. Accordingly, a piece of second pixel information for one pixel is generated from pieces of first pixel information for a plurality of pixels that compose an anti-alias pattern. When a piece of second pixel information is generated using a plurality of pieces of first pixel information corresponding to a number of pixels p pixels high by q pixels wide in the first image, the anti-alias pattern matches an area that is p pixels high by q pixels wide in the first image.

<2-2> Processing Device

<2-2-1> Vector Data Input Unit

The vector data input unit 1001 reads vector data representing a vector image stored in the input data buffer 1006. When the vector data represents a first image composed of line segments, as shown in FIG. 3A, the vector data is composed of coordinate data for the two end points of each line segment (for example, coordinate data on points A and B, and coordinate data on points C and D).

Furthermore, when the vector data represents a first image composed of a Bezier curve P, as shown in FIG. 3B, the vector data is composed of coordinate data for three points on the Bezier curve P (for example, coordinate data for points A, B, and D). Coordinate data for these three points represents coordinate data of three vertices composing a triangle in which the Bezier curve that passes through two of these points is inscribed.

Note that the Bezier curve P refers to the curve represented by coordinates $P(X_p, Y_p)$ in Equations 1 and 2 below.

$$P(t) = \sum_{i=0}^{N-1} B_i \cdot J_{(N-1)i}(t) \qquad \text{[Equation 1]}$$

where N and i are integers one or greater $$J_{ni}(t) = \binom{n}{i} \sum_{i=0}^{N-1} t_i^i (1-t)^{n-1} \qquad \text{[Equation 2]}$$

In the example shown in FIG. 3B, N is set to three, n is set to two, and $B_i$ (i=0, 1, 2) in Equation 1 indicates points A, B, and D in FIG. 3B.

The vector data input unit 1001 performs, for example, the following: conversion of the data format from floating-point format, fixed-point format, etc. to integer format; conversion of the coordinate system (relative coordinate system) in the first image to a coordinate system (absolute coordinate system) in the second image; and parallel translation, enlargement, reduction, modification, etc. of a first image composed of straight lines, curves, etc.

<2-2-2> Curve Segmenting Unit

The curve segmenting unit 1002 performs processing to segment a curve represented by vector data into a plurality of line segments. Specifically, the curve segmenting unit 1002 performs processing to generate line segment data that represents a collection of line segments that connect two adjacent points among a plurality of points along a curve or ellipse.

Figure 3C:
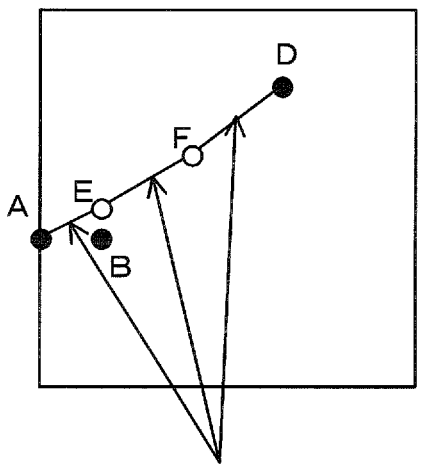

If the vector data represents, for example, a Bezier curve P that connects points A and D as shown in FIG. 3B, the curve segmenting unit 1002 calculates coordinate data for points E and F on the Bezier curve P based on Equations 1 and 2 described above, thus generating line segment data representing three line segments (see FIG. 3C): a line segment connecting points A and E, a line segment connecting points E and F, and a line segment connecting points F and D. This line segment data is composed of data indicating coordinate data for the starting point and ending point of each line segment, as well as the inclination of the line segment (the amount of change in the X coordinate when the Y coordinate increases by one).

<2-2-3> Edge Processing Unit

The edge processing unit 1003 performs processing to create an outline of a first image that represents a graphic or the like. In this processing to create an outline, (the stencil value of) each of the pieces of first pixel information stored in the stencil buffer 1007 is first set to "0".

Next, Bresenham's line drawing algorithm is used to specify the position of a plurality of pixels whose positions overlap with four line segments, 11, 12, 13, and 14, which correspond to the outline of a first image that represents a quadrilateral, as shown in FIG. 4A. For each pixel overlapping with one of the line segments 11, 12, 13, and 14 that respectively form the sides of the quadrilateral, the Y coordinate of the starting point of the overlapping line segment is compared with the Y coordinate of the ending point, and in accordance with the results of comparison, the stencil value of each pixel is set.

If the Y coordinate of the ending point of the line segment traversing a pixel is larger than the Y coordinate of the starting point of the line segment, the stencil value of the pixel, which has previously been set to "0", is set to "+1" by adding "+1" to the stencil value. For example, consider pixel px1 in FIG. 4A. Pixel px1 overlaps with line segment 11, and the Y coordinate of the ending point of the line segment 11 is larger than the Y coordinate of the starting point of the line segment 11. Accordingly, the stencil value of the pixel px1 is set to "+1".

If the Y coordinate of the ending point of the line segment 11, 12, 13, or 14 traversing a pixel is smaller than the Y coordinate of the starting point of the line segment, the stencil value of the pixel is set to "−1" by adding "−1" to the stencil value of "0". For example, consider pixel px2 in FIG. 4A. Pixel px2 overlaps with line segment 13, and the Y coordinate of the starting point of the line segment 13 is smaller than the Y coordinate of the ending point of the line segment 13. Accordingly, the stencil value of the pixel px2 is set to "−1".

Also consider pixel px3 in FIG. 4A. Pixel px3 overlaps with line segment 12, and the difference between the Y coordinate of the starting point of the line segment 12 and the Y coordinate of the ending point of the line segment 12 is less than one pixel. In this case, the Y coordinates of the starting point and the ending point of the line segment 12 are determined to be the same. Nothing is added to the stencil value, and thus the stencil value of the pixel px3 is maintained at "0".

<2-2-4> Filling Unit

As shown in FIG. 4B, the filling unit 1004 sets the stencil value of each pixel located within the outline of the polygon (in FIG. 4B, the quadrilateral) forming the first image to a value other than "0" (in the example shown in FIG. 4B, "+1"). In other words, the filling unit 1004 fills the polygon.

Filling is performed for each line that forms part of the first image G1 and that is composed of a plurality of pixels arranged horizontally.

For example, as shown in FIG. 5A, when filling a line L6 that is sixth from the top among a plurality of lines forming the first image G1, the stencil value of the pixel located at the left edge of the line, i.e. "0", is added to the stencil value of the pixel px61 located second from the left edge of the line L6, i.e. "+1", yielding a value of "+1". The stencil value of the pixel px62, "0", is thus overwritten as "+1" (see FIG. 5B).

Next, under the conditions in FIG. 5B, the stencil value of the pixel located third from the left edge of the line, i.e. "+1", is added to the stencil value of the pixel px63 located fourth from the left edge of the line L6, i.e. "0", yielding a value of "+1", as shown in FIG. 5C. The stencil value of the pixel px63, "0", is thus overwritten as "+1" (see FIG. 5D).

Subsequent processing is a repetition of overwriting the stencil value of the pixel located n+1 pixels from the left edge of the line with the value obtained by adding the stencil value of the pixel located n pixels from the left edge of the line to the stencil value of the pixel located n+1 pixels from the left edge of the line.

Once the stencil values have been overwritten for the entire line L6 in the first image G1, the same processing is repeated for the line vertically adjacent to the line L6 (for example, in FIGS. 5A-5D, line L7).

As shown in FIG. 4B, once filling is complete for the entire first image G1, the stencil value of each pixel within the outline of the quadrilateral has been overwritten as "+1".

During filling, the stencil buffer 1007 is accessed to overwrite the pieces of first pixel information in accordance with a first access pattern that corresponds to a plurality of pieces of first pixel information accessed each time.

While performing filling on the stencil buffer 1007, the filling unit 1004 simultaneously reads stencil data stored therein and outputs the stencil data to the frame data generation unit 1013. In other words, the filling unit 1004 functions as a stencil data read unit to read part of the stencil data from the stencil buffer 1007 in accordance with the first access pattern.

During filling, in order to improve processing speed, a burst transfer of stencil data is performed between the stencil buffer 1007 and the processing device 1020. In other words, each time the processing device 1020 accesses stencil data corresponding to one pixel in the stencil buffer 1007, the processing device 1020 does not repeatedly issue an access request to the stencil buffer 1007, as shown in FIG. 6A. Rather, as shown in FIG. 6B, the processing device 1020 issues an access request to the stencil buffer 1007 to access stencil data corresponding to a plurality of pixels. Hereinafter, the amount of data the processing device 1020 accesses each time the processing device 1020 issues an access request to the stencil buffer 1007 is referred to as the "memory bandwidth". As during filling, in order to improve processing speed, a burst transfer of stencil data is performed between the stencil buffer 1007 and the processing device 1020 during edge processing as well.

In Embodiment 1, the first access pattern is set to the shape of a block that is four pixels in the vertical direction by four pixels in the horizontal direction. The following explains the reason for setting the first access pattern to such a block shape.

Figure 7A:
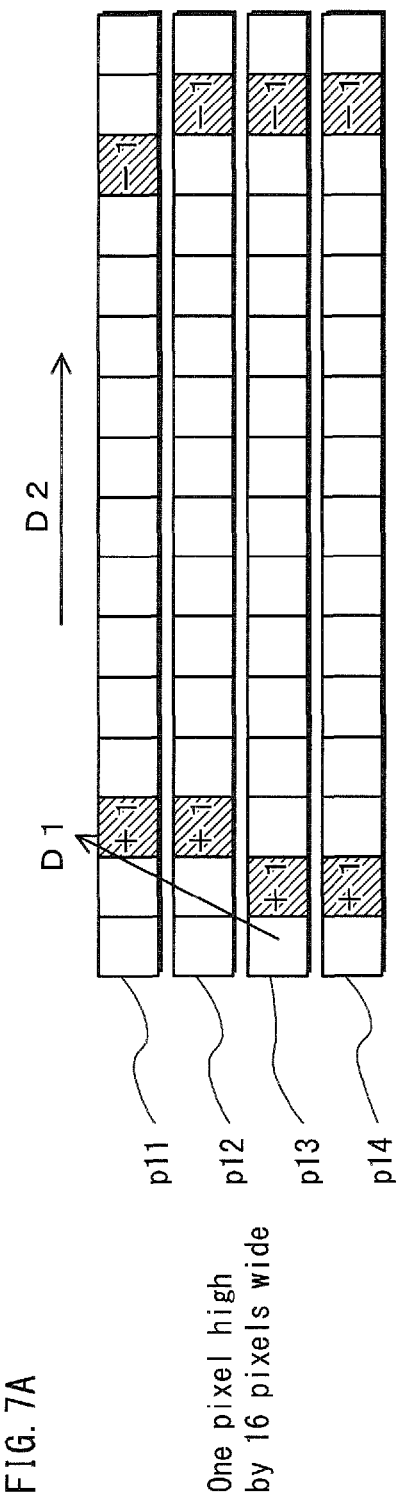
FIGS. 7A and 7B illustrate operations of an edge processing unit in Embodiment 1.
Figure 7B:
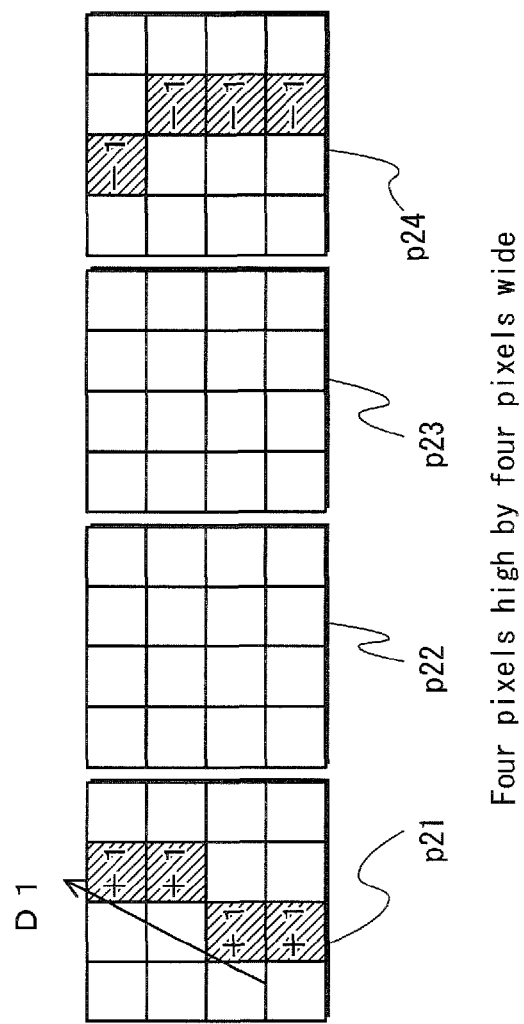

If, as in FIG. 7A, first access patterns p11, p12, p13, and p14 are set to the shape of a line that is one pixel high by 16 pixels wide, the direction D1 of an edge of the 2D shape drawn in the first image does not match the direction D2 in which the plurality of pixels corresponding to the first access patterns p11, p12, p13, and p14 are arranged. Accordingly, during edge processing, in order to access every one of the pieces of first pixel information that needs to be overwritten, it is necessary to access all of the pieces of first pixel information, including pieces of first pixel information that do not need to be overwritten. Conversely, as in FIG. 7B, by setting the first access patterns p21, p22, p23, and p24 to the shape of a block that is four pixels high by four pixels wide, the pieces of first pixel information that need to be accessed are limited to the locations indicated by patterns p21 and p24, based on the coordinate data for the starting points and ending points of line segment data (i.e., access is limited so as not to access pieces of first pixel information corresponding to patterns p22 and p23, which do not need to be overwritten, as in FIG. 7B). Therefore, wasted access is prevented.

During filling, as described above, pieces of first pixel information are overwritten in order from the left edge of each line composed of a plurality of pixels in the first image. As shown in FIG. 8A, if the first access pattern is set to a straight line that is one pixel high by 16 pixels wide, then it is possible to overwrite pieces of first pixel information for the plurality of pixels composing each of the lines L11, L12, L13, and L14 upon each access. In other words, by accessing the pieces of first pixel information four times, the pieces of first pixel information for the plurality of pixels composing each of the lines L11, L12, L13, and L14 are completely overwritten.

On the other hand, as shown in FIG. 8B, if the first access pattern is set to the shape of a block that is four pixels high by four pixels wide, after overwriting pieces of first pixel information for four pixels starting from the left edge, the piece of first pixel information for the fourth pixel from the left edge is stored in a predetermined storage region of, for example, the main storage device. Processing then proceeds to overwriting the piece of first pixel information of a vertically adjacent line. In the processing of block b1 in FIG. 8B, after overwriting of line L11 is complete, the piece of first pixel information for the pixel at the right edge of line L11 is temporarily saved in a predetermined storage region, and processing proceeds to overwriting line L12. Accordingly, it is necessary to perform processing to temporarily save a piece of first pixel information in the predetermined storage region four times before completion of overwriting of all of the pieces of first pixel information for the pixels in block b1.

After completion of overwriting the pieces of first pixel information for a plurality of pixels in the block b1, when overwriting the pieces of first pixel information for pixels in the block b2 on the right side of the block b1, during processing to overwrite each of the lines L11, L12, L13, and L14, the pieces of first pixel information that have been saved in the predetermined storage region when overwriting the block b1 need to be read. Accordingly, it is necessary to perform processing to read a piece of first pixel information four times before completion of overwriting of all of the pieces of first pixel information for the pixels in block b2.

In other words, as shown in FIG. 8B, when the first access pattern is set to a block shape, then as compared to when the first access pattern is set to a line, as shown in FIG. 8A, the efficiency of overwriting processing decreases due to the need for processing to temporarily save an overwritten piece of first pixel information in the predetermined storage region and for processing to read the saved piece of first pixel information.

In Embodiment 1, by contrast, during filling, while using a first access pattern that is in a block shape (e.g., four pixels high by four pixels wide), the processing device 1020 simultaneously overwrites pieces of first pixel information in four parallel vertical lines L11, L12, L13, and L14, as shown by the arrows in FIG. 8C, for the blocks b1, b2, b3, and b4 accessed by the first access pattern.

In other words, after overwriting of block b1 is complete, processing to save pieces of first pixel information for four pixels arranged vertically at the right edge of the block 1 in the predetermined storage region is performed only once. Next, when overwriting the pieces of first pixel information in block b2 on the right side of block b1, processing to read, from the predetermined storage region, the stencil values of four pixels arranged vertically at the right edge of the block 1 is performed only once. Accordingly, as compared to the example shown in FIG. 8B, the number of times that processing is performed to temporarily save pieces of first pixel information in the predetermined storage region and to read the pieces of first pixel information from the predetermined storage region is reduced. Therefore, as compared to the example shown in FIG. 8B, it is possible to prevent a reduction in the efficiency of overwriting.

The filling unit 1004 also has a function to count the cumulative number of accesses to the stencil buffer 1007 and output the cumulative number of accesses to the frame data generation unit 1013.

<2-2-5> Frame Data Generation Unit

The frame data generation unit 1013 generates a piece of second pixel information from part of the stencil data input from the filling unit 1004.

In Embodiment 1, a piece of second pixel information indicates a value reflecting the opaqueness (alpha value) of each pixel (hereinafter referred to as "coverage value"). For example, if the coverage value is one, the opaqueness is at a maximum, and as the coverage value falls lower than one, the opaqueness decreases. By appropriately setting the opaqueness at the edge of the second image, aliasing that occurs at the edge of the second image is controlled.

The coverage value reflects the number of pieces of first pixel information having a stencil value of "+1" among the pieces of first pixel information used in generating a piece of second pixel information for one pixel in the second image.

For example, if the anti-alias pattern is set to four pixels high by four pixels wide, the filling unit 1004 counts the number of pixels with a stencil value of "+1" in the anti-alias pattern. If, for example, there are five pixels with a stencil value of "+1" in the anti-alias pattern that is four pixels high by four pixels wide, the coverage value is 5/16.

Assuming the stencil value of each pixel in the first image is set as shown in

Figure 9A:
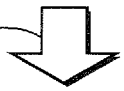
FIGS. 9A and 9B illustrate calculation of coverage values in Embodiment 1.
Figure 9B:
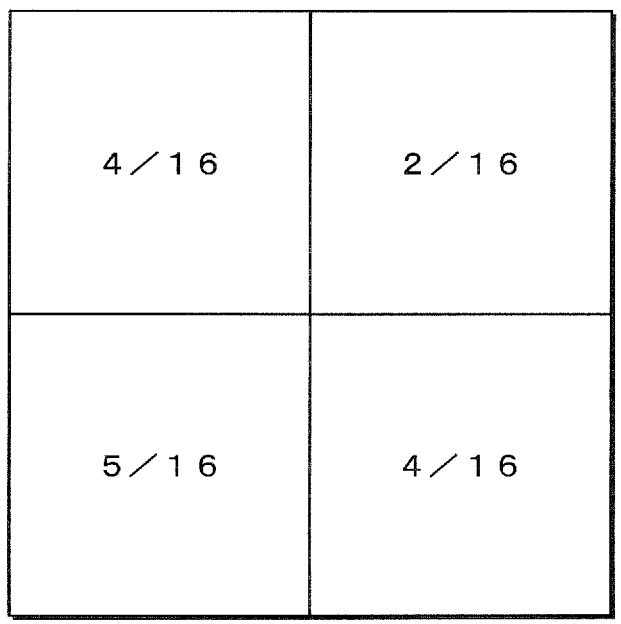

FIG. 9A, and the anti-alias pattern is four pixels high by four pixels wide, the coverage value of pixels in regions of the second image corresponding to the anti-alias pattern are shown in FIG. 9B.

When the filling unit 1004 uses the first access pattern to access the stencil data and read part of the stencil data by sliding the first access pattern horizontally across the first image as shown in FIG. 10, the frame data generation unit 1013 generates, in order, parts of the frame data located in the second image at positions corresponding to the first access pattern in the first image, as shown in FIG. 10.

The frame data generation unit 1013 has a function to store information regarding the size of stencil data previously stored in the stencil buffer 1007. Based on this information regarding the size of the stencil data, on the cumulative number of accesses to the stencil buffer 1007 as input from the filling unit 1004, and on the first access pattern acquired from the pattern storage unit 1009, the frame data generation unit 1013 has a function to determine whether all of the parts of the frame data corresponding to the entire stencil data have been output to the frame data writing unit 1014.

<2-2-6> Access Pattern Setting Unit

Based on the first access pattern and on the anti-alias pattern, the access pattern setting unit 1005 sets the second access pattern with respect to the frame buffer 1008. The second access pattern indicates the distribution pattern of pixels corresponding to a plurality of pieces of second pixel information that are accessed each time.

Figure 11:
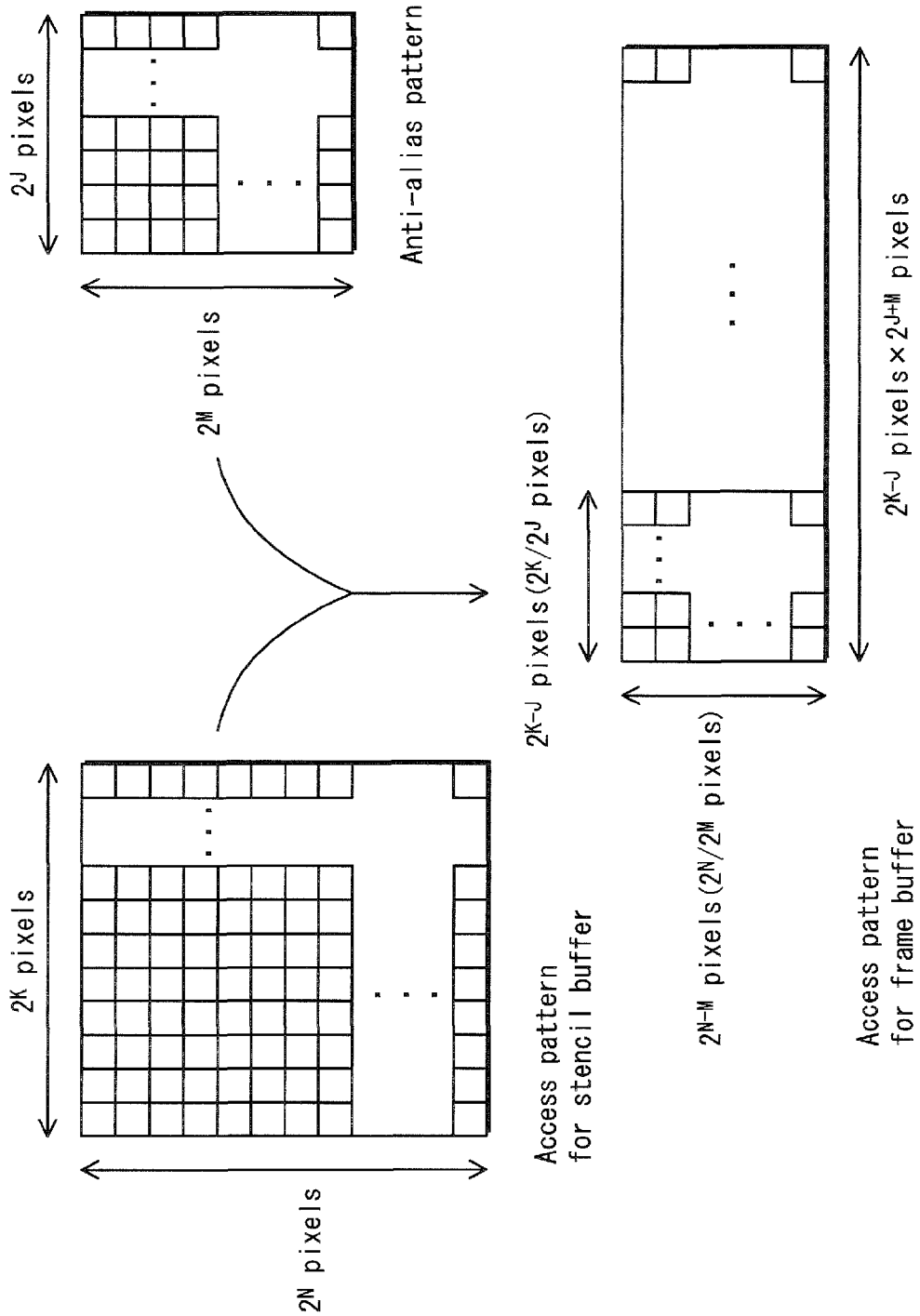
FIG. 11 is a front view of a display unit that composes part of a pattern input unit (user interface) in Embodiment 1.

As shown in FIG. 11, if the first access pattern is set to $2^N$ pixels high by $2^K$ pixels wide (a block or a line), and the anti-alias pattern is set to $2^M$ pixels high by $2^J$ pixels wide, the access pattern setting unit 1005 sets the second access pattern to $2^{N-M}$ pixels high by $2^{K-J}$ pixels×$2^{J+M}$ pixels wide (a block or a line). In this context, the conditions that N≥M and K≥J hold true. In other words, the number of pixels included in the first access pattern and the number of pixels included in the second access pattern are both set to $2^{N+K}$.

Since the anti-alias pattern ($2^M$ pixels high×$2^J$ pixels wide) fits within the first access pattern ($2^N$ pixels high×$2^K$ pixels wide) $2^{N-M}$ times vertically and $2^{K-J}$ times horizontally, efficiency of access to the stencil buffer 1007 is improved.

Figure 12:
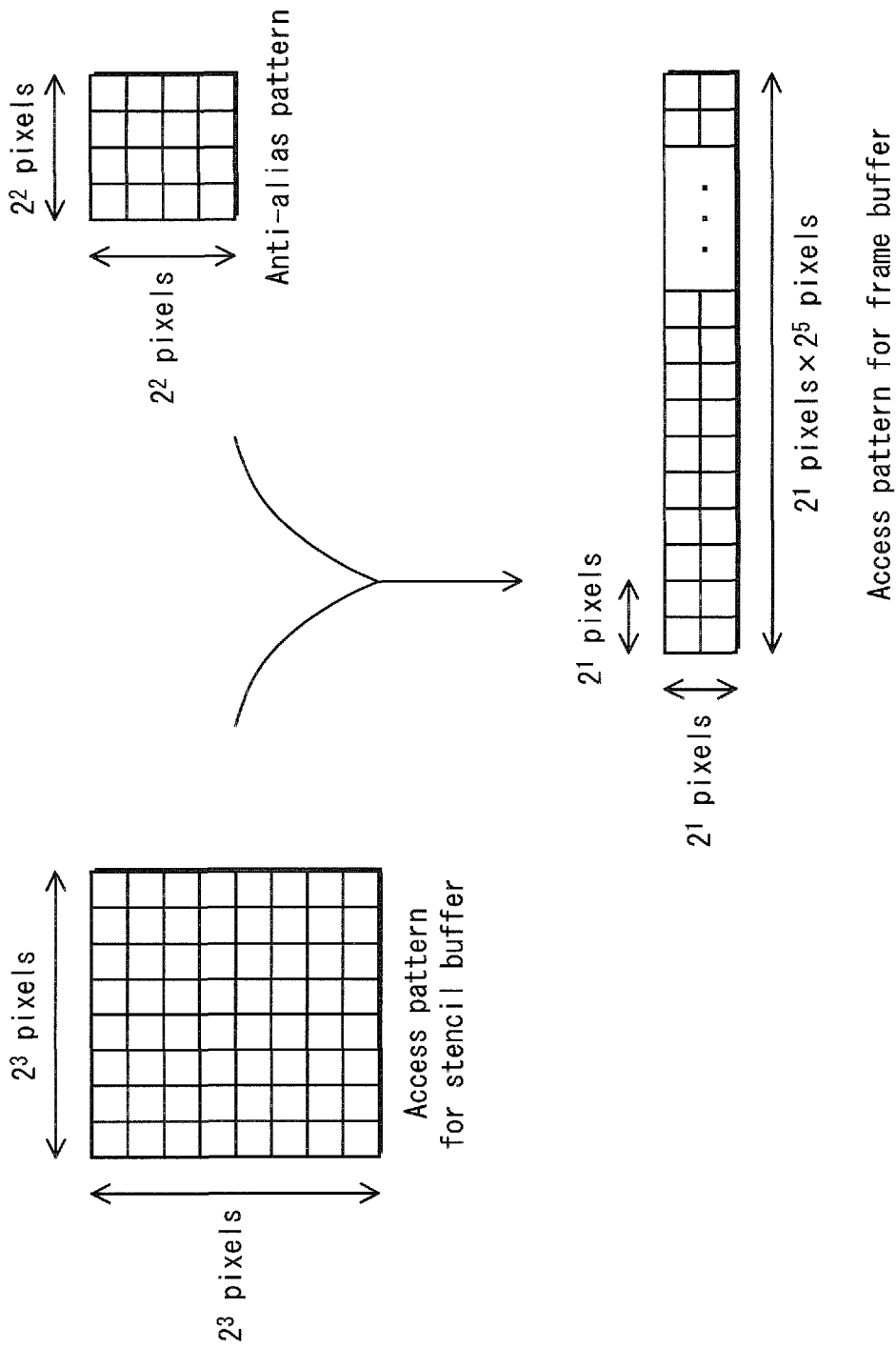
FIG. 12 illustrates operations of an access pattern setting unit in Embodiment 1.

For example, as shown in FIG. 12, if the edge processing unit 1003 and the filling unit 1004 use a first access pattern that is $2^3$ pixels high by $2^3$ pixels wide, and the frame data generation unit 1013 uses an anti-alias pattern that is $2^2$ pixels high by $2^2$ pixels wide, the access pattern setting unit 1005 sets the second access pattern to be $2^1$ pixels high by $2^1$×$2^4$, i.e. $2^5$, pixels wide.

In addition to setting the second access pattern, the access pattern setting unit 1005 also sets the number of times the frame data writing unit 1014 accesses the frame buffer 1008. Note that the access pattern setting unit 1005 calculates and sets the number of accesses (access frequency) to the stencil buffer 1007 and the frame buffer 1008 in accordance with the first access pattern and the calculated second access pattern.

Suppose that (i) the first access pattern is set to $2^N$ pixels high by $2^K$ pixels wide (a block or a line), (ii) the second access pattern is set to $2^{N-M}$ pixels high by $2^{K-J}$ pixels×$2^{J+M}$ pixels wide (a block or a line), and (iii) the memory bandwidth is the same for access to both the stencil buffer 1007 and the frame buffer 1008. Then the access pattern setting unit 1005 sets the number of accesses so that by accessing the stencil buffer 1007 a total of $2^{J+M}$ times, the frame buffer 1008 is accessed once, since for a memory bandwidth of $2^{N+K}$ pixels, a part of the frame data that is $2^{N-M}$ pixels high by $2^{K-J}$ pixels wide is generated for one access to the stencil buffer 1007.

Figure 13:
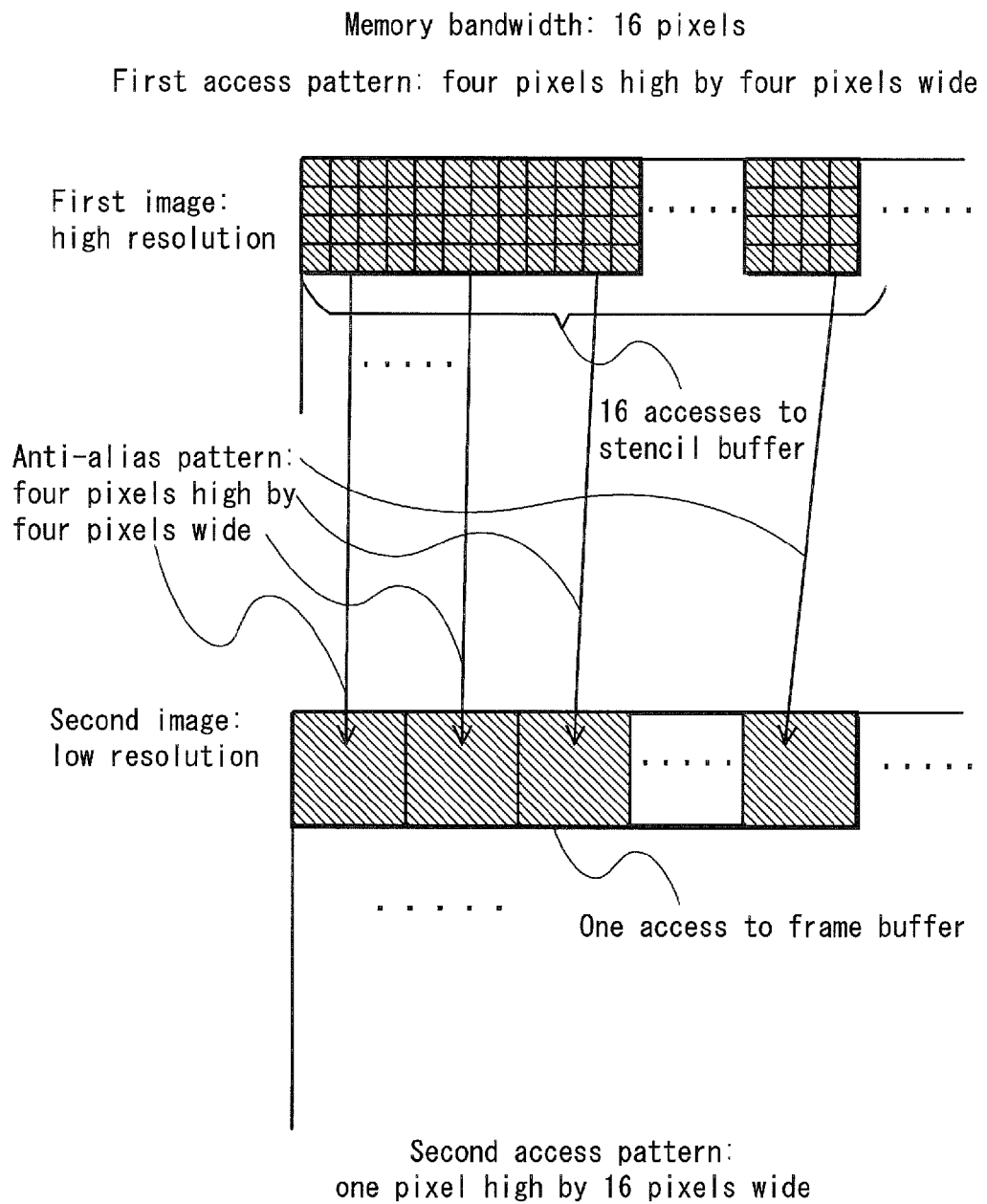
FIG. 13 illustrates an example of operations of the access pattern setting unit in Embodiment 1.

As shown in FIG. 13, if the first access pattern is set to four pixels high by four pixels wide, and the anti-alias pattern is set to four pixels high by four pixels wide, then the second access pattern is set to one pixel high by 16 pixels wide, and the number of accesses to the frame buffer 1008 is set so that for every 16 accesses to the stencil buffer 1007, the frame buffer 1008 is accessed once. With these settings, during edge processing by the edge processing unit 1003 and filling by the filling unit 1004, a part of stencil data corresponding to a region in the high-resolution first image that is four pixels high by 64 pixels wide is read by the processing device 1020 accessing the stencil buffer 16 times. Next, during generation of frame data by the frame data generation unit 1013, a part of the frame data corresponding to a one pixel high by 16 pixel wide region in the second image, which is a lower resolution than the first image, is generated from the part of the stencil data. During processing by the frame data writing unit 1014 to write frame data, the processing device 1020 then accesses the frame buffer 1008 once to write, in the frame buffer 1008, the part of the frame data corresponding to the one pixel high by 16 pixel wide region in the second image.

As shown in FIG. 14A, if the first access pattern is set to four pixels high by four pixels wide, and the anti-alias pattern is set to four pixels high by four pixels wide, then the second access pattern is set to one pixel high by 16 pixels wide, and the number of accesses to the stencil buffer 1007 is set to 16 accesses for one access to the frame buffer 1008.

As shown in FIG. 14B, if the first access pattern is set to four pixels high by four pixels wide, and the anti-alias pattern is set to two pixels high by four pixels wide, then the second access pattern is set to two pixels high by eight pixels wide, and the number of accesses to the stencil buffer 1007 is set to eight accesses for one access to the frame buffer 1008.

As shown in FIG. 14C, if the first access pattern is set to four pixels high by four pixels wide, and the anti-alias pattern is set to four pixels high by two pixels wide, then the second access pattern is set to one pixel high by 16 pixels wide, and the number of accesses to the stencil buffer 1007 is set to eight accesses for one access to the frame buffer 1008.

As shown in FIG. 14D, if the first access pattern is set to four pixels high by four pixels wide, and the anti-alias pattern is set to two pixels high by two pixels wide, then the second access pattern is set to two pixels high by eight pixels wide, and the number of accesses to the stencil buffer 1007 is set to four accesses for one access to the frame buffer 1008.

As shown in FIG. 14E, if the first access pattern is set to four pixels high by four pixels wide, and the anti-alias pattern is set to one pixel high by one pixel wide, that is if anti-aliasing has been set not to be performed, then the second access pattern is set to four pixels high by four pixels wide, and the number of accesses to the stencil buffer 1007 is set to one access for one access to the frame buffer 1008.

In accordance with the second access pattern set by the access pattern setting unit 1005, the frame data writing unit 1014 writes pieces of second pixel information in order in the frame buffer 1008 by accessing the corresponding storage region in the frame buffer 1008 while sliding the second access pattern horizontally across the second image as shown in FIG. 10B.

<2-2-7> Frame Data Writing Unit and Rendering Unit

The frame data writing unit 1014 has a second pixel information holding unit (not shown in the figures) that temporarily holds a plurality of pieces of second pixel information input from the frame data generation unit 1013 and at least corresponding in number to the second access pattern. Note that the second pixel information holding unit is implemented as, for example, a storage region, register, etc. in the main storage device.

The rendering unit 1010 renders frame data stored in the frame buffer 1008 on the display 1015.

<2-3> Other

The pattern storage unit 1009 is composed of a collection of registers and stores information on the first access pattern and information on the anti-alias pattern in separate registers. For example, as information on the first access pattern, the pattern storage unit 1009 stores information indicating access to part of the stencil data corresponding to a plurality of pixels within a block shape that is four pixels high by four pixels wide in the first image.

Figure 15:
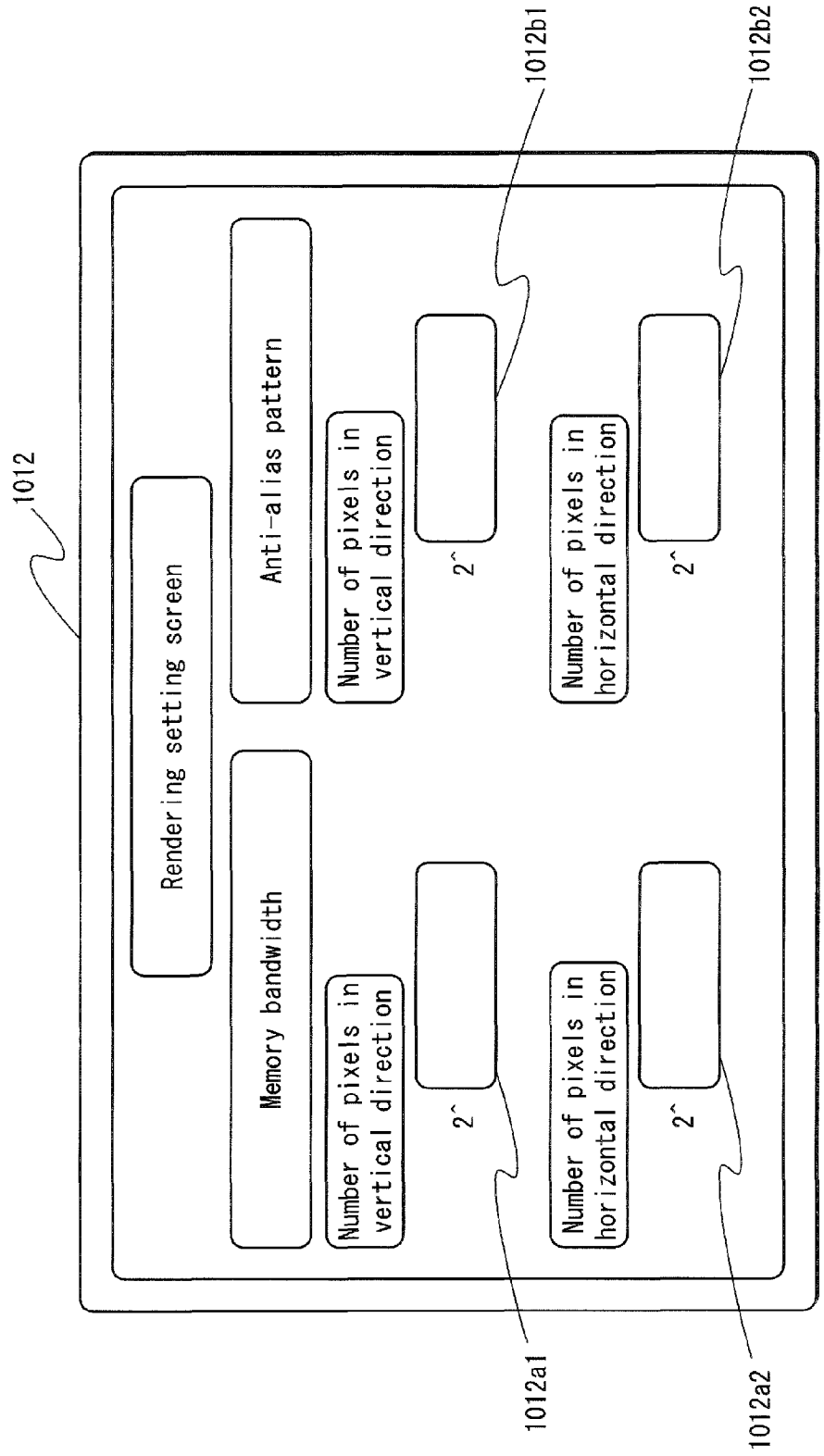
FIG. 15 illustrates operations of the access pattern setting unit in Embodiment 1.

The pattern input unit 1012 is composed of a user interface via which a user can input numerical values on a screen, as shown in FIG. 15. The user uses this interface when storing information on the first access pattern and the anti-alias pattern in the pattern storage unit 1009. In the user interface shown in FIG. 15, by inputting multipliers into the input columns 1012a1 and 1012a2 (for example, two in the input column 1012a1 and two in the input column 1012a2), the first access pattern is set to $2^2$ pixels×$2^2$ pixels (=four pixels×four pixels). Also, by inputting multipliers into the input columns 1012b1 and 1012b2 (for example, two in the input column 1012b1 and two in the input column 1012b2), the anti-alias pattern is set to $2^2$ pixels×$2^2$ pixels (=four pixels×four pixels).

In Embodiment 1, by appropriately setting the second access pattern and the access frequency of the frame buffer 1008, the efficiency of access is improved, and control to change the data amount (memory bandwidth) transferred by accessing the frame buffer 1008 one time thus becomes unnecessary.

<3> Operations

The following describes operations in Embodiment 1.

<3-1> Overall Operations

Figure 16:
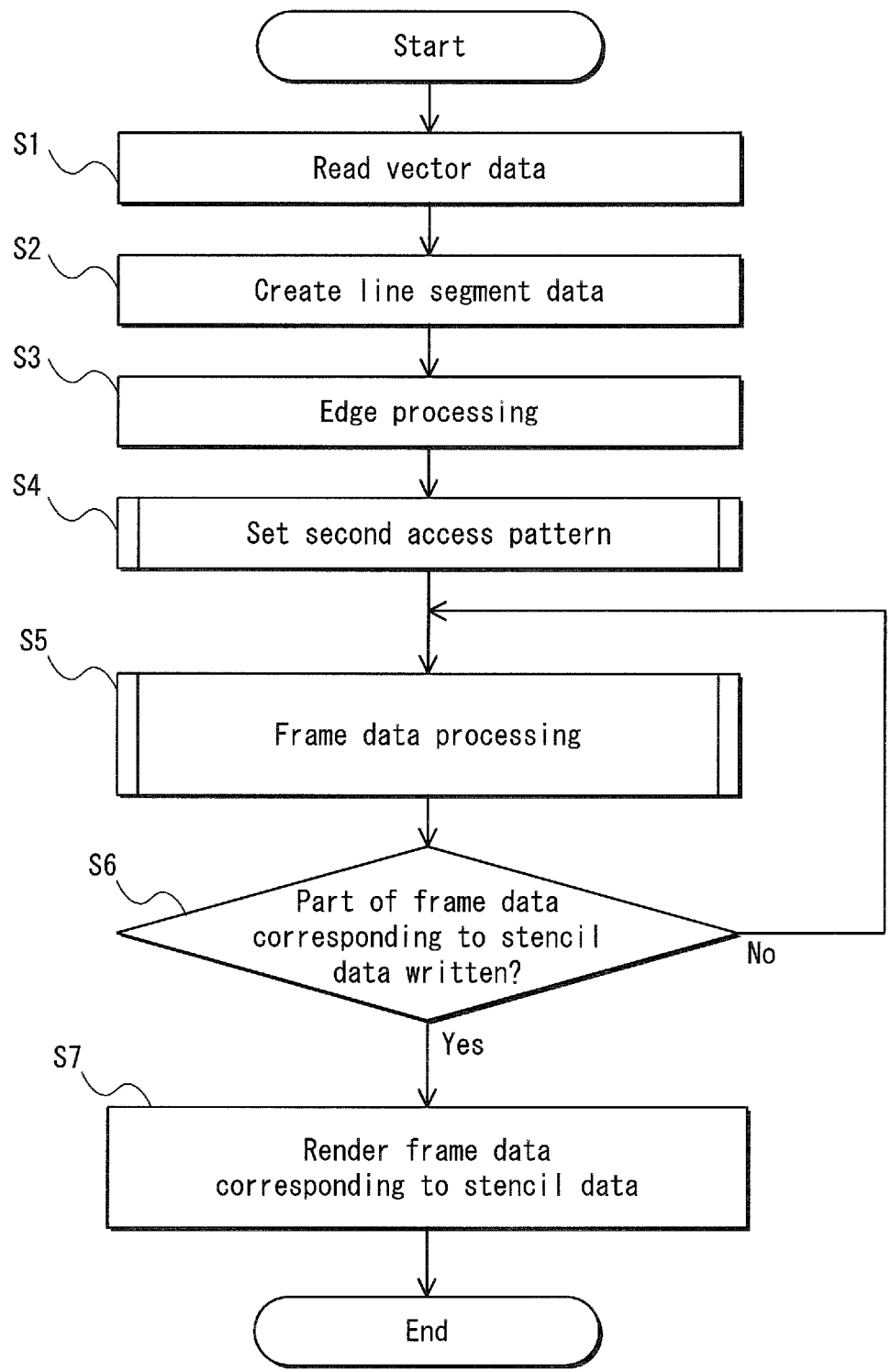
FIG. 16 is a flowchart showing operations of the graphics rendering device in Embodiment 1.

The following describes overall operations of the graphics rendering device according to Embodiment 1 with reference to FIG. 16.

First, the vector data input unit 1001 reads vector data stored in the input data buffer 1006 (step S1) and outputs the vector data to the curve segmenting unit 1002. Based on the vector data input from the vector data input unit 1001, the curve segmenting unit 1002 then generates line segment data (step S2) and outputs the line segment data to the edge processing unit 1003.

Next, based on a plurality of pieces of line segment data input from the curve segmenting unit 1002, the edge processing unit 1003 accesses the stencil buffer 1007 via the first access pattern to perform edge processing (step S3). At this point, based on the first access pattern and the anti-alias pattern acquired from the pattern storage unit 1009, the access pattern setting unit 1005 calls a subroutine to set the second access pattern and to set the number of accesses to the stencil buffer 1007 and to the frame buffer 1008 (step S4).

Subsequently, the frame data generation unit 1013 generates a part of the frame data from the stencil data read by the filling unit 1004 and calls a subroutine for the frame data writing unit 1014 to write the part of the frame data in the frame buffer 1008 (step S5). In the following description, generation and writing of part of the frame data are referred to as frame data processing.

Next, the frame data generation unit 1013 determines whether the part of the frame data has been completely written into the frame buffer 1008. This determination is made by determining whether the part of the frame data corresponding to all of the stencil data has been completely output to the frame buffer 1008, based on the size of the stencil data, the cumulative number of accesses to the stencil buffer 1007 by the filling unit 1004 as output by the filling unit 1004, and the first access pattern read from the pattern storage unit 1009 (step S6).

If it is determined in step S6 that the part of the frame data corresponding to all of the stencil data has not been completely output to the frame buffer 1008 (step S6: No), then processing returns to step S5.

Conversely, if it is determined in step S6 that the part of the frame data corresponding to all of the stencil data has been completely output to the frame buffer 1008 (step S6: Yes), then the rendering unit 1010 acquires frame data from the frame buffer 1008 and renders the frame data on the display 1015 (step S7).

<3-2> Operations to Set the Second Access Pattern

Figure 17:
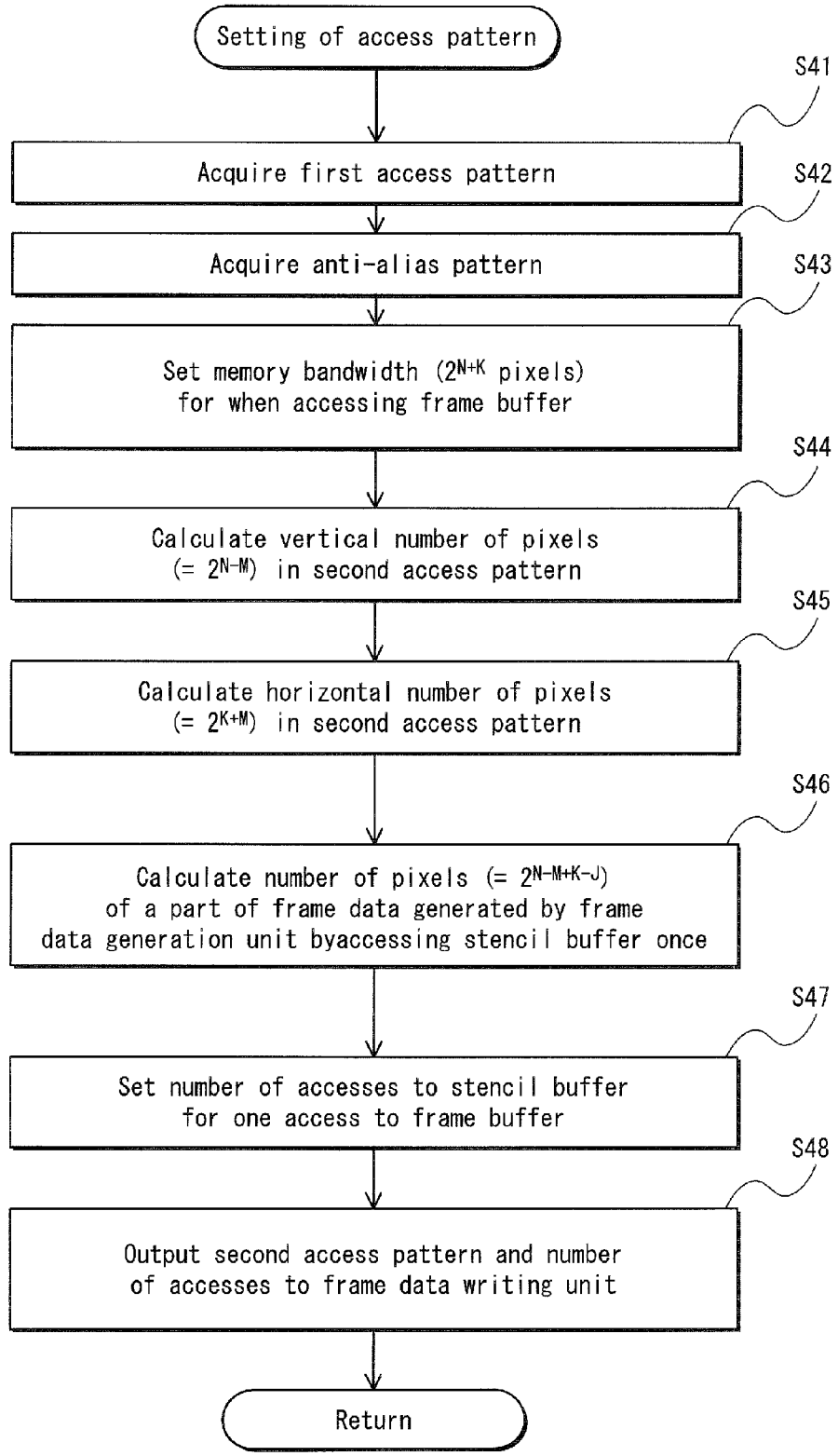
FIG. 17 is a flowchart showing operations to set a second access pattern in Embodiment 1.

Next, the subroutine for setting the second access pattern in the graphics rendering device 1000 according to Embodiment 1 is described with reference to FIG. 17.

First, upon acquiring the first access pattern from the pattern storage unit 1009 (step S41), based on the number of pixels $2^{N+K}$ of the first access pattern, the memory bandwidth when accessing the frame buffer 1008 is set to the number of pixels $2^{N+K}$ of a piece of second pixel information (step S42).

Next, the anti-alias pattern is acquired from the pattern storage unit 1009 (step S43), the vertical number of pixels $2^N$ of the first access pattern is divided by the vertical number of pixels $2^M$ of the anti-alias pattern, and the number of pixels $2^{N-M}$ thus calculated is set as the vertical number of pixels of the second access pattern (step S44).

Subsequently, the number of pixels $2^{N+K}$ corresponding to the memory bandwidth when accessing the frame buffer 1008 is divided by the horizontal number of pixels $2^{N-M}$ of the second access pattern, and the number of pixels $2^{K+M}$ thus calculated is set as the horizontal number of pixels of the second access pattern (step S45).

Next, the horizontal number of pixels $2^K$ in the first access pattern is divided by the horizontal number of pixels $2^J$ in the anti-alias pattern. The number of pixels $2^{K-J}$ thus calculated is multiplied by the vertical number of pixels $2^{N-M}$ in the second access pattern to calculate the number of pixels $2^{N-M+K-J}$ of a part of frame data generated by the frame data generation unit 1013 by accessing the stencil buffer 1007 one time (step S46). The memory bandwidth $2^{N+K}$ is divided by this number of pixels $2^{N-M+K-J}$, and the resulting value is set as the number of accesses to the stencil buffer 1007 for one access to the frame buffer 1008 (step S47).

Finally, the second access pattern and the number of accesses are output to the frame data writing unit 1014 (step S48).

<3-3> Operations During Frame Data Processing

Figure 18:
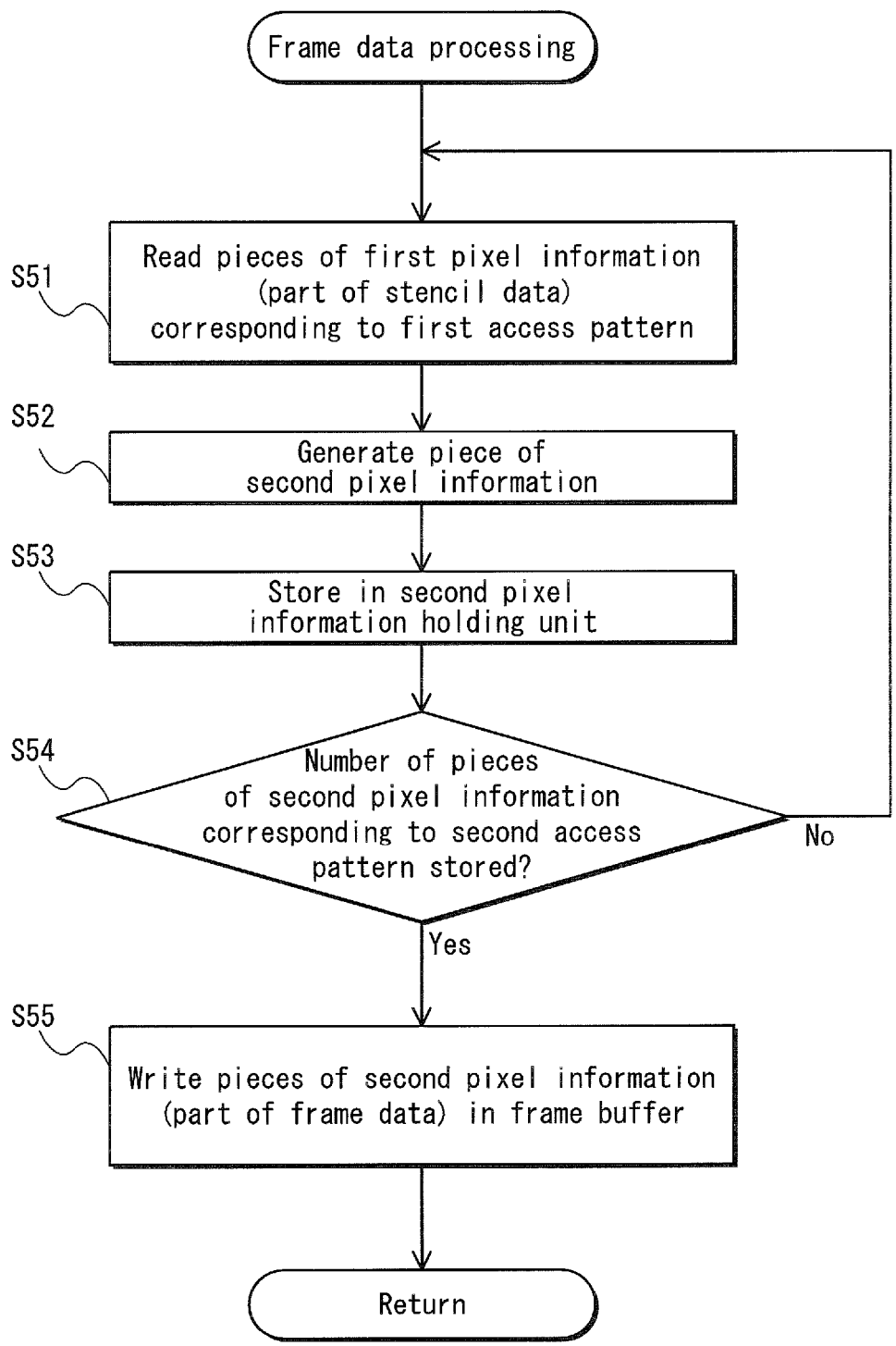
FIG. 18 is a flowchart showing generation of frame data and writing of frame data in Embodiment 1.

The following describes a subroutine to generate part of the frame data and to write the frame data (i.e., frame data processing) in the graphics rendering device 1000 according to Embodiment 1 with reference to FIG. 18.

First, the filling unit 1004 performs filling and, in accordance with the first access pattern acquired from the pattern storage unit 1009, reads part of the stencil data stored in the stencil buffer 1007 and outputs the part of the stencil data to the frame data generation unit 1013 (step S51).

Next, the frame data generation unit 1013 generates a piece of second pixel information from the part of the stencil data output by the filling unit 1004 and outputs the piece of second pixel information to the frame data writing unit 1014 (step S52). At this point, the frame data writing unit 1014 stores the piece of second pixel information input from the frame data generation unit 1013 in the second pixel information holding unit (step S53).

The frame data writing unit 1014 determines whether a number of pieces of second pixel information corresponding to the second access pattern have been stored in the second pixel information holding unit (step S54). The frame data writing unit 1014 makes this determination based on the number of accesses output by the access pattern setting unit 1005 (i.e., the number of times the filling unit 1004 accesses the stencil buffer 1007 for one access to the frame buffer 1008 by the frame data writing unit 1014).

In step S54, if the frame data writing unit 1014 determines that a number of pieces of second pixel information corresponding to the second access pattern have not yet been stored in the second pixel information holding unit (step S54: No), then in accordance with the first access pattern, the stencil buffer 1007 is accessed again to read part of the stencil data (step S51).

Conversely, in step S54, if the frame data writing unit 1014 determines that a number of pieces of second pixel information corresponding to the second access pattern have been stored in the second pixel information holding unit (step S54: Yes), then in accordance with the second access pattern, the frame data writing unit 1014 accesses the frame buffer 1008 one time to write, in the frame buffer 1008, a part of the frame data composed of the pieces of second pixel information stored in the second pixel information holding unit (step S55). When the frame data writing unit 1014 finishes writing part of the frame data, the frame data writing unit 1014 deletes the content of the second pixel information holding unit.

<Embodiment 2>

The following describes Embodiment 2. Note that operations are the same as in Embodiment 1, and therefore a description thereof is omitted.

<1> Structure

The graphics rendering device 1000 in Embodiment 2 has approximately the same structure as in Embodiment 1. Only the functions of the edge processing unit 1003, filling unit 1004, frame data generation unit 1013, access pattern setting unit 1005, and frame data writing unit 1014 differ.

Figure 19:
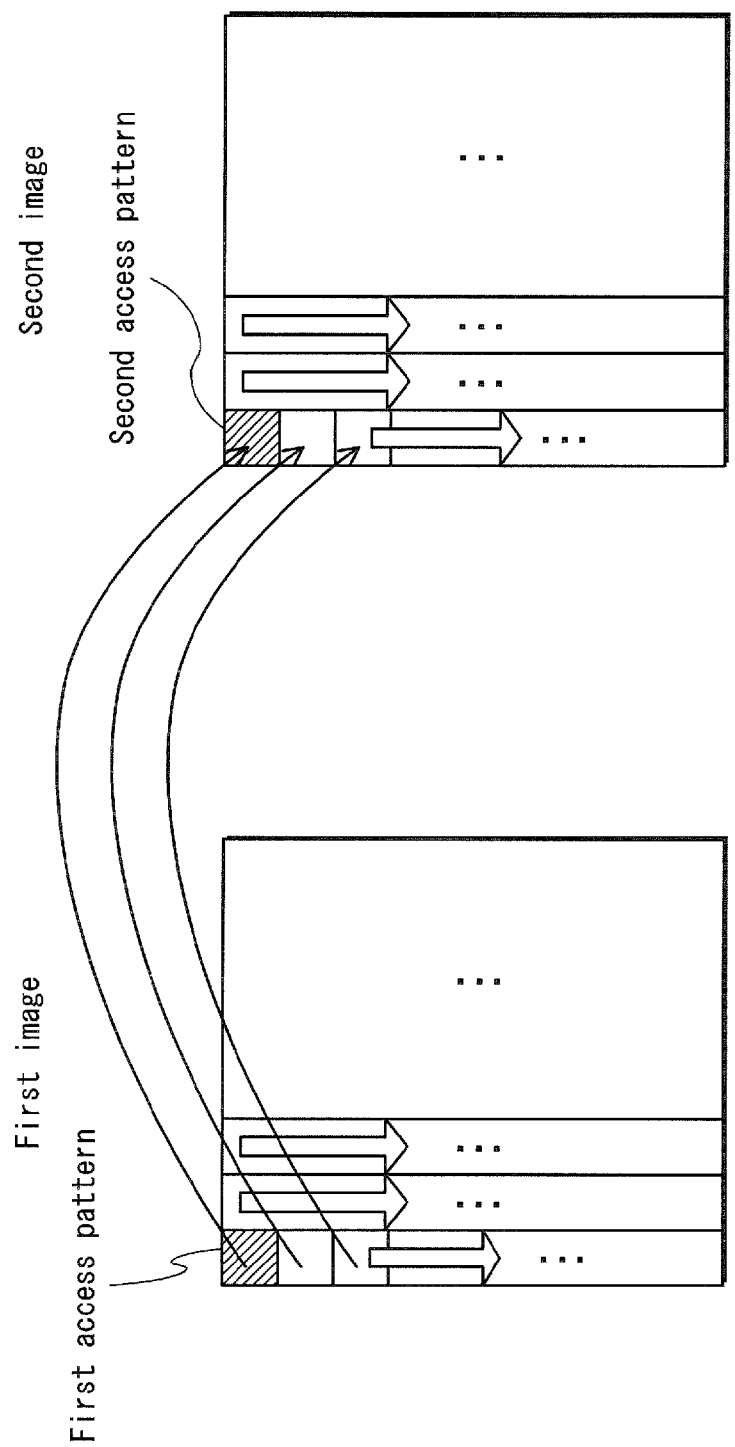
FIG. 19 illustrates operations to access the stencil buffer and the frame buffer in Embodiment 2.

In Embodiment 2, the filling unit 1004 uses the first access pattern to access the stencil data and read part of the stencil data by sliding the first access pattern vertically across the first image as shown in FIG. 19, and the frame data generation unit 1013 generates, in order, pieces of second pixel information in the second image at positions corresponding to the first access pattern in the first image, as shown in FIG. 19.

Based on the first access pattern and on the anti-alias pattern, the access pattern setting unit 1005 sets the second access pattern with respect to the frame buffer, the second access pattern indicating the distribution pattern of pixels corresponding to a plurality of pieces of second pixel information that are accessed each time.

If the edge processing unit 1003 and the filling unit 1004 use a first access pattern set to $2^N$ pixels high by $2^K$ pixels wide (a block or a line), and the frame data generation unit 1013 uses an anti-alias pattern set to $2^M$ pixels high by $2^J$ pixels wide, then the access pattern setting unit 1005 sets the second access pattern to $2^{N-M}$ pixels×$2^{M+J}$ pixels high by $2^{K-J}$ pixels wide (a block or a line). In this context, the conditions that N≥M and K≥J hold true. In other words, the number of pixels included in the first access pattern and the number of pixels included in the second access pattern are both set to $2^{N+K}$.

In addition to setting the second access pattern, the access pattern setting unit 1005 also sets the number of times the frame data writing unit 1014 accesses the frame buffer 1008.

Figure 20:
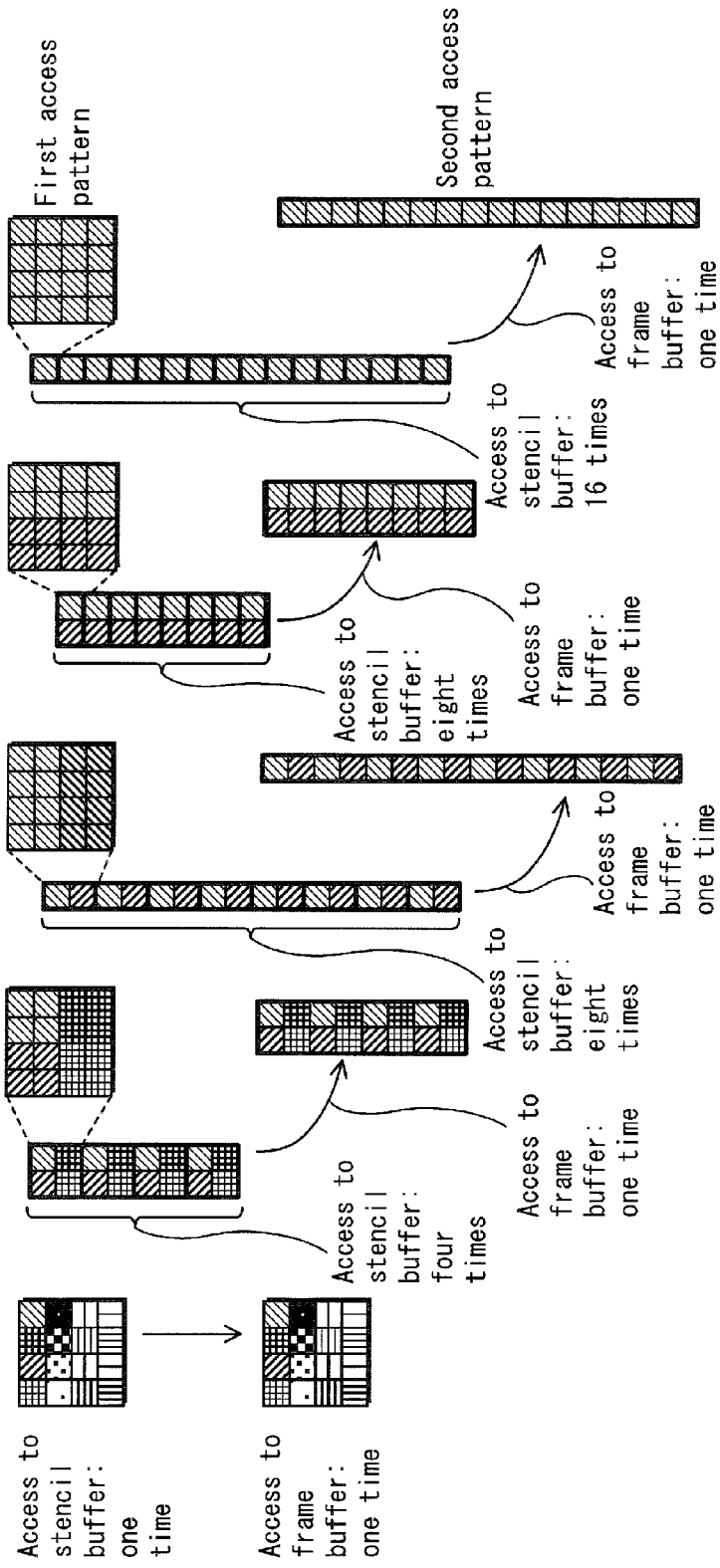
FIGS. 20A, 20B, 20C, 20D, and 20E illustrate operations of the access pattern setting unit in Embodiment 2.

As shown in FIG. 20A, if the first access pattern is set to four pixels high by four pixels wide, and the anti-alias pattern is set to four pixels high by four pixels wide, then the second access pattern is set to 16 pixels high by one pixel wide, and the number of accesses to the stencil buffer 1007 is set to 16 accesses for one access to the frame buffer 1008.

As shown in FIG. 20B, if the first access pattern is set to four pixels high by four pixels wide, and the anti-alias pattern is set to four pixels high by two pixels wide, then the second access pattern is set to eight pixels high by two pixels wide, and the number of accesses to the stencil buffer 1007 is set to eight accesses for one access to the frame buffer 1008.

As shown in FIG. 20C, if the first access pattern is set to four pixels high by four pixels wide, and the anti-alias pattern is set to two pixels high by four pixels wide, then the second access pattern is set to 16 pixels high by one pixel wide, and the number of accesses to the stencil buffer 1007 is set to eight accesses for one access to the frame buffer 1008.

As shown in FIG. 20D, if the first access pattern is set to four pixels high by four pixels wide, and the anti-alias pattern is set to two pixels high by two pixels wide, then the second access pattern is set to eight pixels high by two pixels wide, and the number of accesses to the stencil buffer 1007 is set to four accesses for one access to the frame buffer 1002.

As shown in FIG. 20E, if the first access pattern is set to four pixels high by four pixels wide, and the anti-alias pattern is set to one pixel high by one pixel wide, that is if anti-aliasing has been set not to be performed, then the second access pattern is set to four pixels high by four pixels wide, and the number of accesses to the stencil buffer 1007 is set to one access for one access to the frame buffer 1008.

In accordance with the second access pattern set by the access pattern setting unit 1005, the frame data writing unit 1014 writes pieces of second pixel information in order in the frame buffer 1008 by accessing the corresponding storage region in the frame buffer 1008 while sliding the second access pattern vertically across the second image as shown in FIG. 19.

In Embodiment 2, by appropriately setting the second access pattern and the access frequency of the frame buffer 1008, the efficiency of access is improved, and control to change the data amount (memory bandwidth) transferred by accessing the frame buffer 1008 one time becomes unnecessary.

<Embodiment 3>

The following describes Embodiment 3.

<1> Structure

The graphics rendering device 1000 in Embodiment 3 has approximately the same structure as in Embodiment 1. Only the frame buffer 1008 and the function of the access pattern setting unit 1005 differ. Note that, like Embodiment 1, the access pattern setting unit 1005 is implemented by the processing device 1020 executing appropriate programs.

Based on the first access pattern and on the anti-alias pattern, the access pattern setting unit 1005 sets the second access pattern corresponding to a plurality of pieces of second pixel information.

The frame buffer 1008 is composed of DRAM that has a variable burst length function to vary the burst length in response to a request from the processing device 1020.

Figure 21:
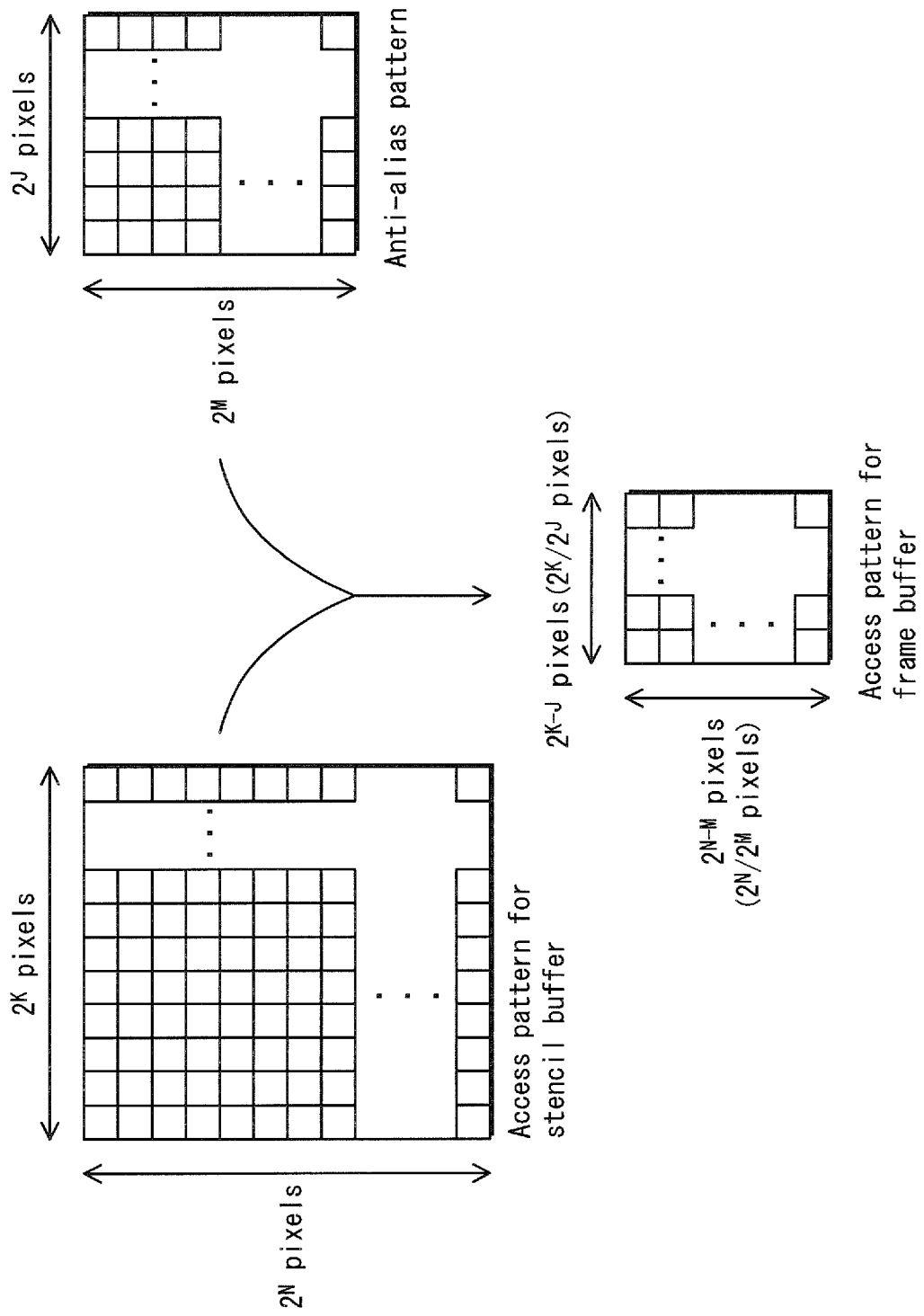
FIG. 21 illustrates operations of the access pattern setting unit in Embodiment 3.

As shown in FIG. 21, if the first access pattern is set to $2^N$ pixels high by $2^K$ pixels wide (a block or a line) and the anti-alias pattern is set to $2^M$ pixels high by $2^J$ pixels wide, the access pattern setting unit 1005 sets the second access pattern to $2^{N-M}$ pixels high by $2^{K-J}$ pixels wide (a block or a line). In this context, the conditions that N≥M and K≥J hold true.

Figure 22:
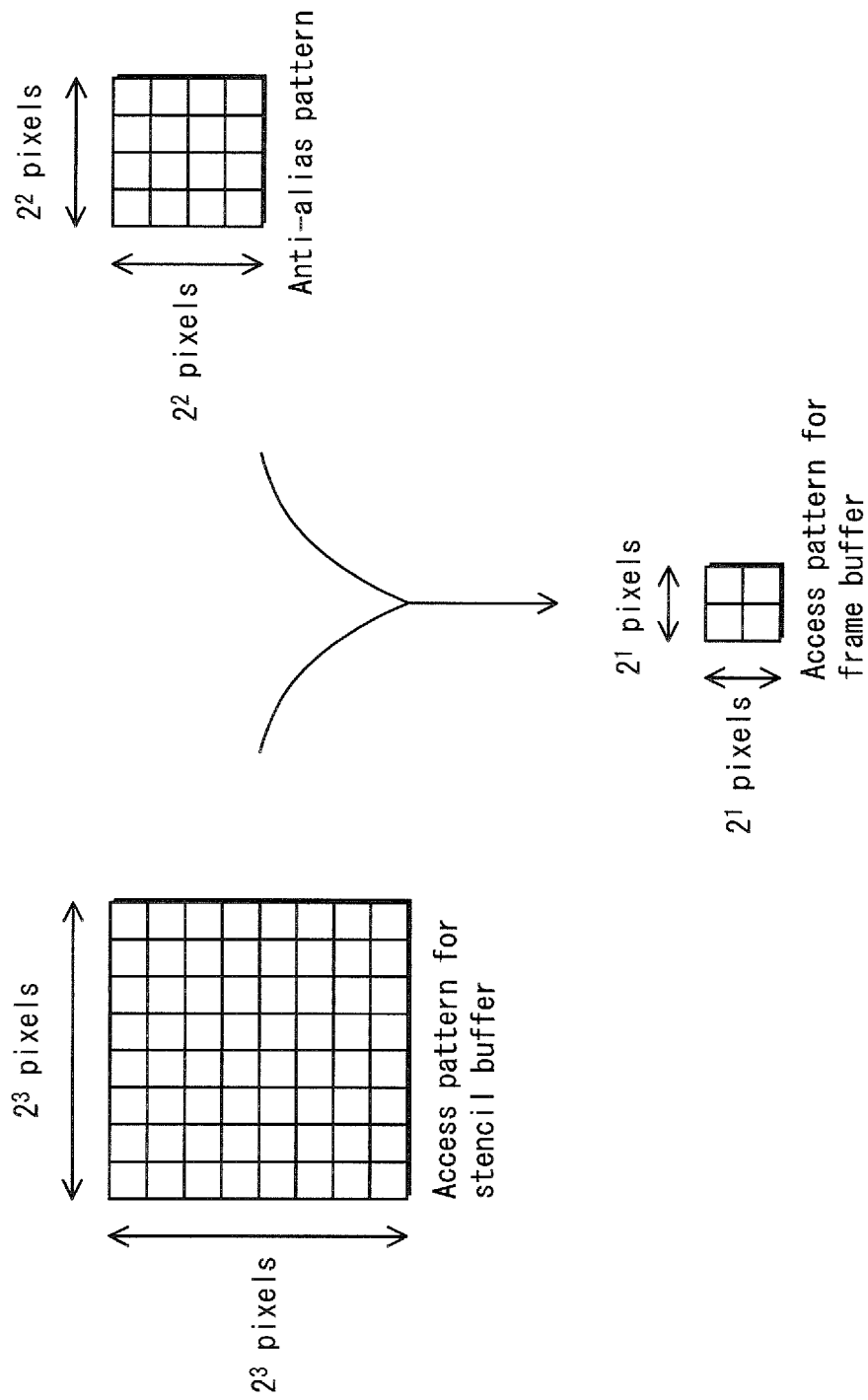
FIG. 22 illustrates an example of operations of the access pattern setting unit in Embodiment 3.

As shown in FIG. 22, if the first access pattern is set to $2^3$ pixels high by $2^3$ pixels wide, and the anti-alias pattern is set to $2^2$ pixels high by $2^2$ pixels wide, the access pattern setting unit 1005 sets the second access pattern to $2^1$ pixels high by $2^1$ pixels wide.

Figure 23A:
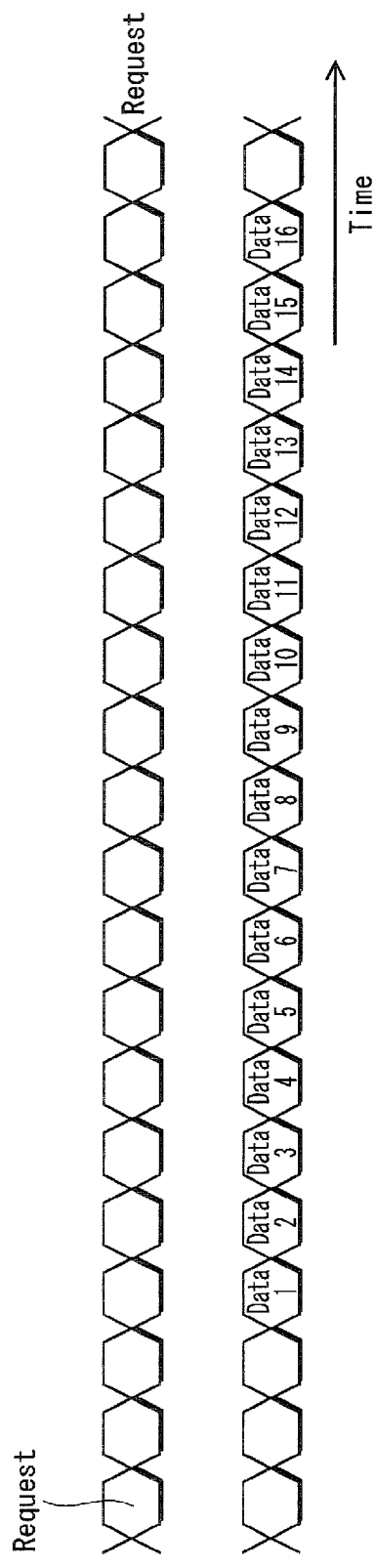
FIGS. 23A and 23B illustrate a method of accessing the stencil buffer and the frame buffer in Embodiment 3.
Figure 23B:
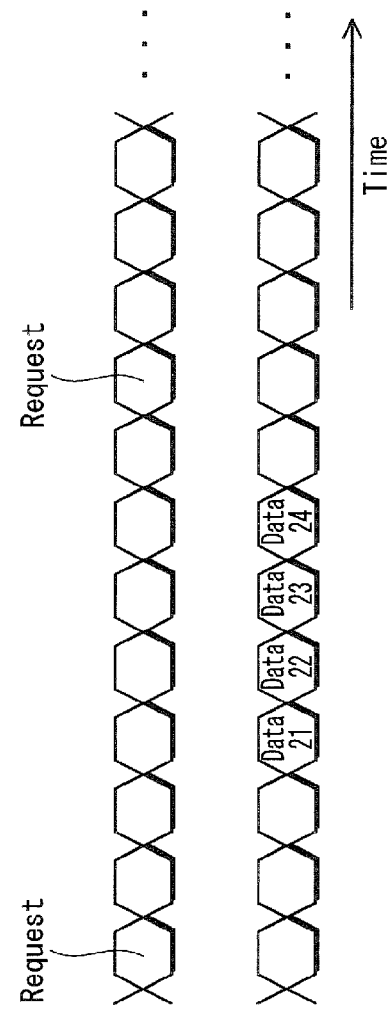

The access pattern setting unit 1005 changes the memory bandwidth when accessing the frame buffer 1008 based on the second access pattern. For example, if the first access pattern is set to 16 pixels (four pixels high×four pixels wide), then during edge processing and filling, the processing device 1020 performs a burst transfer of part of the stencil data from the stencil buffer 1007 at a memory bandwidth setting of 16 pixels (Data 1 through Data 16 in FIG. 23A). In this context, if the anti-alias pattern is set to two pixels high×two pixels wide, then during frame data writing, the processing device 1020 performs a burst transfer to the frame buffer 1008 of part of the frame data at a memory bandwidth setting of four pixels (Data 21 through Data 24 in FIG. 23B).

Next, the function of the access pattern setting unit 1005 is described.

As shown in FIG. 24A, if the first access pattern is set to four pixels high by four pixels wide, and the anti-alias pattern is set to four pixels high by four pixels wide, then the second access pattern is set to one pixel high by 16 pixels wide, and the memory bandwidth when accessing the frame buffer 1008 is set to one pixel.

As shown in FIG. 24B, if the first access pattern is set to four pixels high by four pixels wide, and the anti-alias pattern is set to two pixels high by four pixels wide, then the second access pattern is set to two pixels high by eight pixels wide, and the memory bandwidth when accessing the frame buffer 1008 is set to two pixels.

As shown in FIG. 24C, if the first access pattern is set to four pixels high by four pixels wide, and the anti-alias pattern is set to four pixels high by two pixels wide, then the second access pattern is set to one pixel high by 16 pixels wide, and the memory bandwidth when accessing the frame buffer 1008 is set to two pixels.

As shown in FIG. 24D, if the first access pattern is set to four pixels high by four pixels wide, and the anti-alias pattern is set to two pixels high by two pixels wide, then the second access pattern is set to two pixels high by eight pixels wide, and the memory bandwidth when accessing the frame buffer 1008 is set to four pixels.

As shown in FIG. 24E, if the first access pattern is set to four pixels high by four pixels wide, and the anti-alias pattern is set to one pixel high by one pixel wide, that is if anti-aliasing has been set not to be performed, then the second access pattern is set to four pixels high by four pixels wide, and the memory bandwidth when accessing the frame buffer 1008 is set to 16 pixels. The memory bandwidth is not changed in this case.

The frame data writing unit 1014 performs frame data writing processing to write, in the frame buffer 1008, frame data generated by the frame data generation unit 1013 by accessing each storage region in which is stored part of the frame data corresponding to the second access pattern as set by the access pattern setting unit 1005. During writing of frame data by the frame data writing unit 1014, data is transferred between the frame buffer 1008 and the processing device 1020 by burst transfer, as during the edge processing and filling described above.

The rendering unit 1010 accesses the frame buffer 1008 to acquire frame data and renders the frame data on the display 1015.

In Embodiment 3, during processing to write frame data, the memory bandwidth when the frame data writing unit 1014 writes to the frame buffer 1008 upon accessing the frame buffer 1008 one time is changed in accordance with the size of a plurality of pieces of second pixel information generated by the frame data generation unit 1013 from part of the stencil data read when the frame data generation unit 1013 accesses the stencil buffer 1007 one time. Therefore, it is not necessary to provide the frame data writing unit 1014 with a second pixel information holding unit (not shown in the figures) as is provided in Embodiment 1 and Embodiment 2.

<3> Operations

The graphics rendering device 1000 in Embodiment 3 is approximately the same as Embodiment 1. The subroutine to set the second access pattern, as well as the frame data processing subroutine to generate part of the frame data and to write the frame data, differ from Embodiment 1. The following is a description of the subroutine to set the second access pattern and the frame data processing subroutine to generate part of the frame data and to write the frame data.

<3-1> Operations to Set the Second Access Pattern

Figure 25:
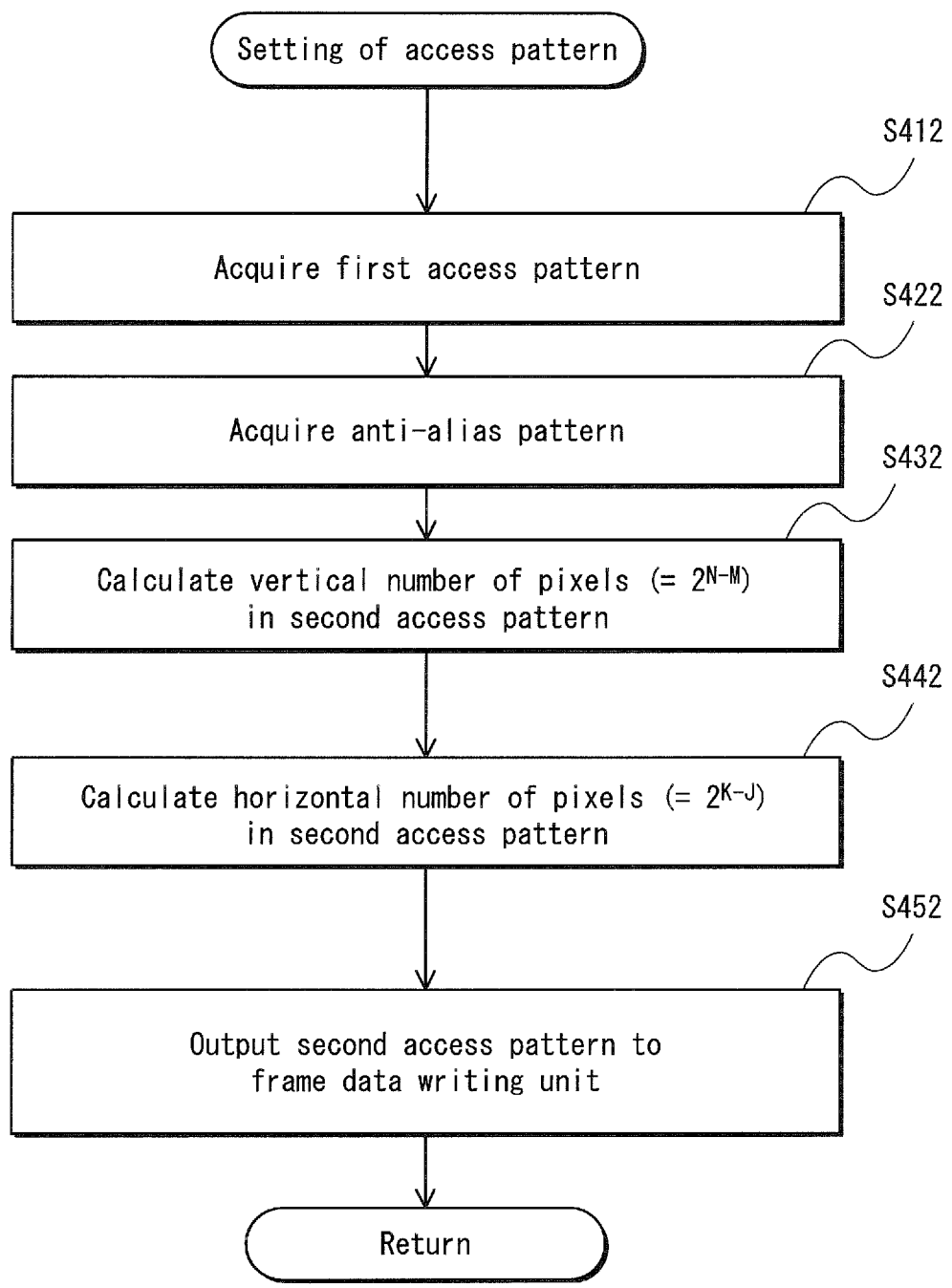
FIG. 25 is a flowchart showing operations to set the second access pattern in Embodiment 3.

Next, the subroutine for setting the second access pattern in the graphics rendering device 1000 according to Embodiment 3 is described with reference to FIG. 25.

First, the first access pattern is acquired from the pattern storage unit 1009 (step S412), and the anti-alias pattern is acquired (step S422).

Next, the vertical number of pixels $2^N$ of the first access pattern is divided by the vertical number of pixels $2^M$ of the anti-alias pattern, and the number of pixels $2^{N-M}$ thus calculated is set as the vertical number of pixels of the second access pattern (step S432). Next, the vertical number of pixels $2^N$ of the first access pattern is divided by the vertical number of pixels $2^M$ of the anti-alias pattern, and the number of pixels $2^{N-M}$ thus calculated is set as the vertical number of pixels of the second access pattern (step S442).

Finally, the second access pattern is output to the frame data writing unit 1014 (step S452).

<3-2> Operations During Frame Data Processing

Figure 26:
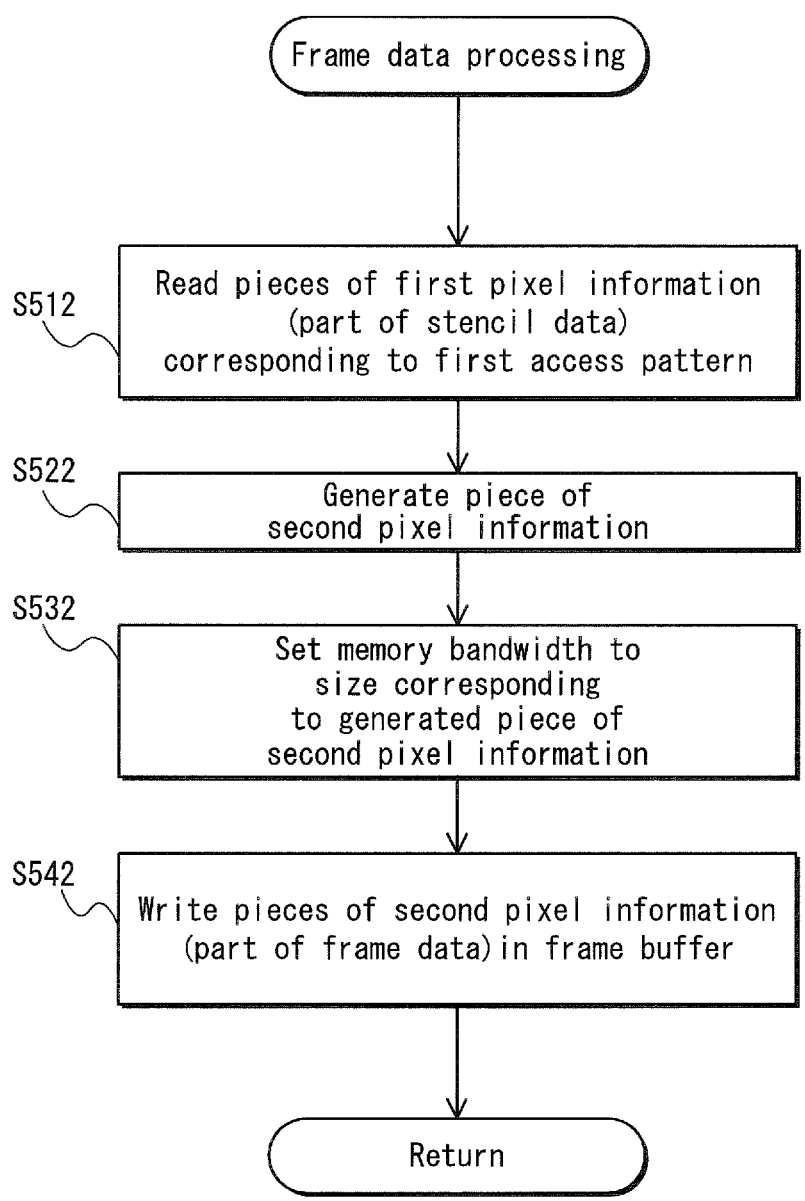
FIG. 26 is a flowchart showing generation of frame data and writing of frame data in Embodiment 3.
Figure 29A:
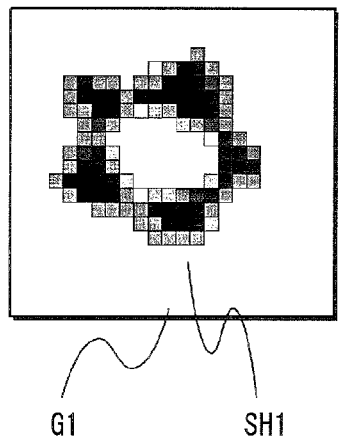
FIGS. 29A, 29B, and 29C illustrate operations in a conventional example.
Figure 29B:
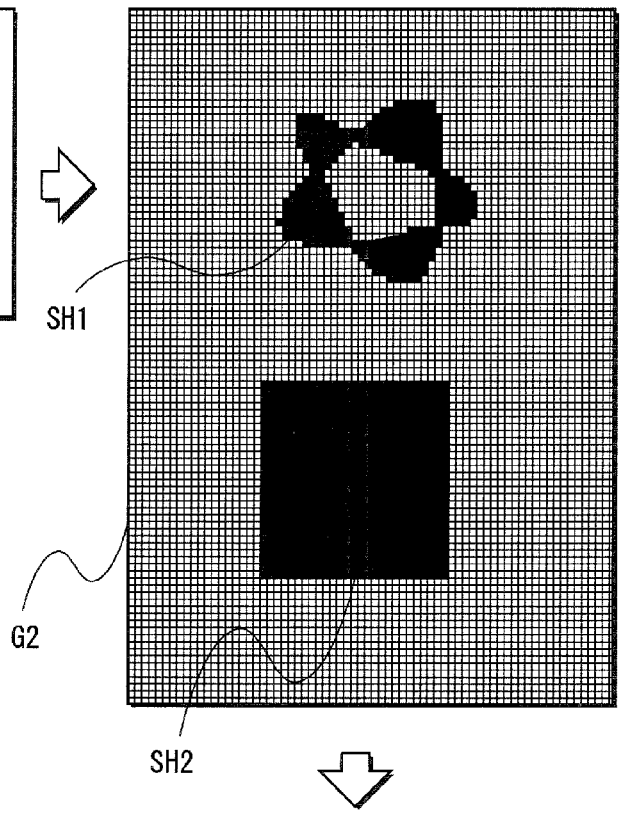
Figure 29C:
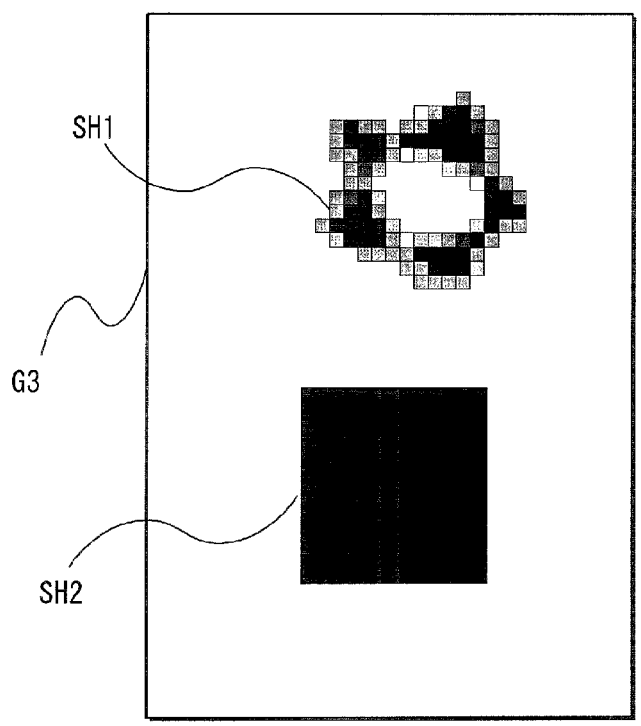
Figure 30A:
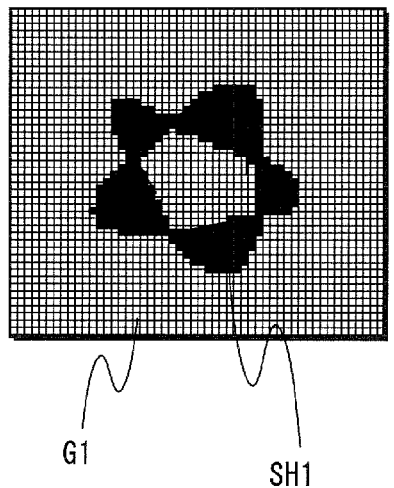
FIGS. 30A, 30B, and 30C illustrate operations in another conventional example.
Figure 30B:
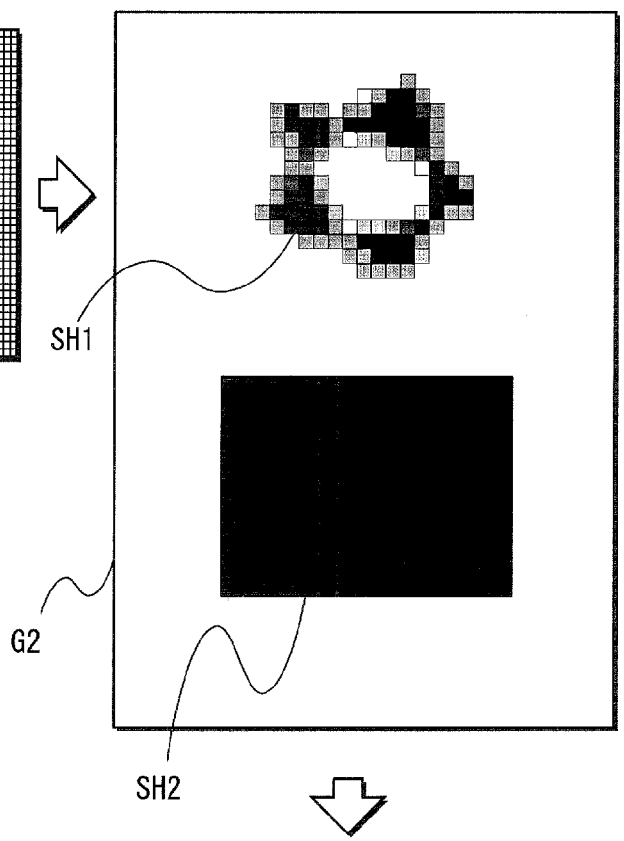
Figure 30C:
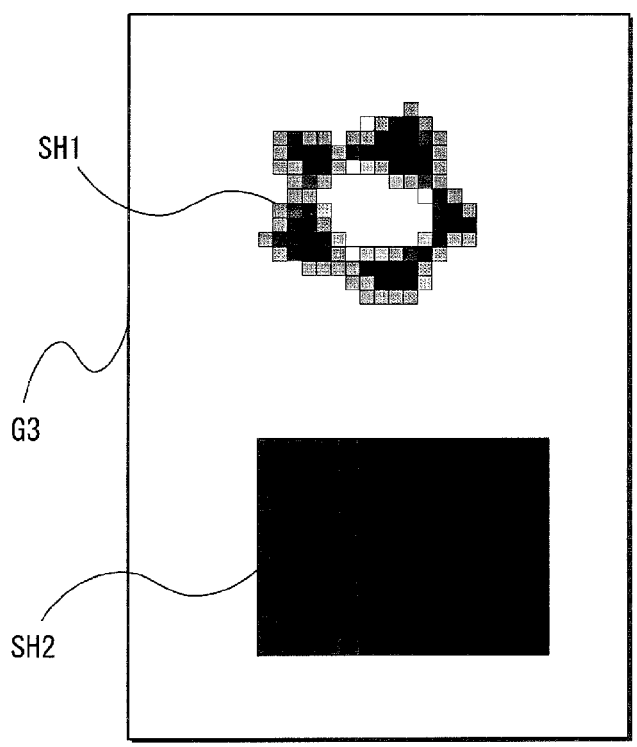
Figure 31A:
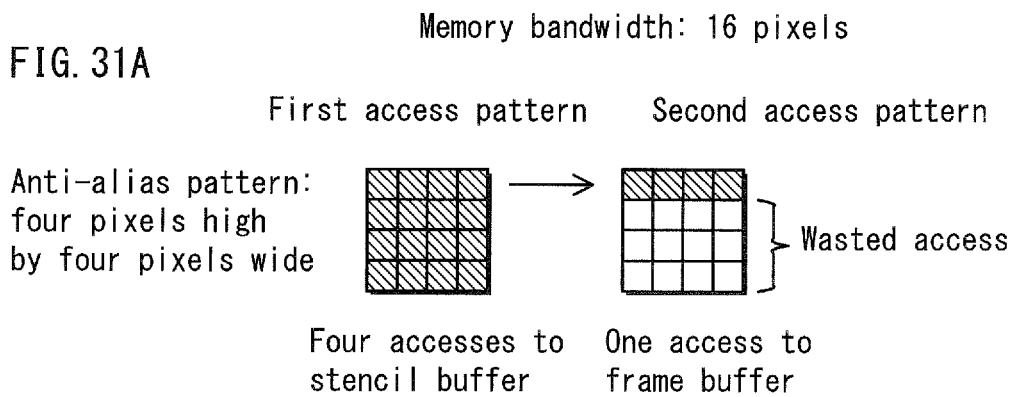
FIGS. 31A and 31B illustrate operations in another conventional example.
Figure 31B:
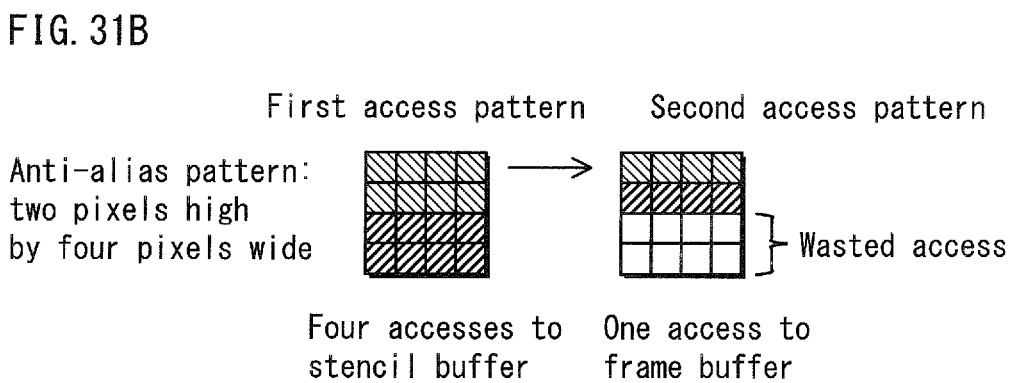

The following describes, with reference to FIG. 26, a frame data processing subroutine to generate part of the frame data and to write the frame data in the graphics rendering device 1000 according to Embodiment 3.

The filling unit 1004 performs filling and, in accordance with the first access pattern acquired from the pattern storage unit 1009, reads part of the stencil data stored in the stencil buffer 1007 and outputs the part of the stencil data to the frame data generation unit 1013 (step S512).

Next, the frame data generation unit 1013 generates a plurality of pieces of second pixel information from the part of the stencil data output by the filling unit 1004 and outputs the pieces of second pixel information to the frame data writing unit 1014 (step S522).

Subsequently, the processing device 1020 issues a burst length change request to the frame buffer 1008. The frame data generation unit 1013 generates a memory bandwidth (burst length), setting the memory bandwidth to a size corresponding to the pieces of second pixel information input into the frame data writing unit 1014 (step S532). Specifically, the frame data generation unit 1013 sets the memory bandwidth to a size corresponding to pieces of second pixel information for $2^{N-M+K-J}$ pixels, the pieces of second pixel information having been generated from a part of stencil data that is read by the filling unit 1004 accessing the stencil buffer 1007 one time and output to the frame data generation unit 1013.

Finally, the frame data writing unit 1014 accesses the frame buffer 1008 one time, in accordance with the second access pattern, to write therein a part of the frame data composed of the pieces of second pixel information stored in the second pixel information holding unit (step S542).

<Modifications>

(1) In Embodiments 1-3, an example has been described in which the input data buffer 1006, stencil buffer 1007, and frame buffer 1008 are physically separate memories. These elements, however, may be formed from the same physical memory and provided as differing storage regions.

Furthermore, in this Modification, a cache memory (not shown in the figures) that temporarily stores data of a certain size may be provided.

Such a cache memory controls an increase in latency caused by competition for access to the memory in the processing device 1020.

(2) In Embodiments 1-3, an example has been described in which the stencil buffer 1007 and the frame buffer 1008 are composed of physically separate DRAMs, but the present invention is not limited in this way. For example, one DRAM with a variable burst length function may be used, with a storage region serving as the stencil buffer 1007 and a storage region serving as the frame buffer 1008 provided within the DRAM. The processing device 1020 may then vary the burst length when accessing the storage region serving as the stencil buffer 1007 and when accessing the storage region serving as the frame buffer 1008.

According to this Modification, since the stencil buffer 1007 and the frame buffer 1008 are formed on one DRAM, the space provided within the graphics rendering device for memories such as DRAMs is reduced.

(3) In Embodiments 1-3, an example has been described in which the curve segmenting unit 1002 generates line segments that connect points from vector data, but the present invention is not limited in this way. For example, a function may be provided for converting vector data that represents a vector image into point data formed from a collection of points that are near each other at the resolution of the first image.

According to this Modification, since data such as data on the inclination of straight lines is no longer necessary, processing to calculate the inclination of straight lines, etc. is unnecessary. Furthermore, data representing straight lines and data representing curves may be handled in the same data format.

(4) In Embodiments 1-3, an example of edge processing has been described in which the relationship between the rendering direction of line segments forming edges and the value added to the stencil value is such that, when rendering a line segment in the positive direction along the Y axis of the first image, processing is set to add a value of +1 (or an integer larger than +1) to the stencil value, but the present invention is not limited in this way. For example, when rendering a line segment in the positive direction along the Y axis of the first image, processing may be set to add a value of −1 (or an integer smaller than −1) to the stencil value.

Also, in this Modification, a line segment may always be rendered in the positive direction (or the negative direction) along the Y axis of the first image, regardless of the direction from the starting point of the line segment to the ending point, and the sign of the value added to the stencil value may be changed in accordance with the direction from the starting point to the ending point.

(5) In Embodiments 1-3, an example has been described in which, during filling, by requesting to access the stencil buffer 1007 one time, the processing device 1020 accesses a storage region in which stencil data corresponding to a part of the first image that is eight pixels high by eight pixels wide is stored. While overwriting this stencil data corresponding to a plurality of pixels, the processing device 1020 outputs each of the stencil values to the frame data generation unit 1013, but the present invention is not limited in this way. During filling, the stencil data need not be overwritten, and the stencil values may simply be output to the frame data generation unit 1013.

Since stencil data is not overwritten in this Modification, the processing load during filling is reduced.

(6) In Embodiments 1 and 2, an example has been described in which vector data representing a vector image that has been enlarged at a ratio of the resolution of the first image to the resolution of the second image is stored in the input data buffer 1006, but the present invention is not limited in this way. For example, when vector data is input into the vector data input unit 1001, the vector data input unit 1001 may generate vector data representing a vector image enlarged at the ratio of the resolution of the first image to the resolution of the second image.

Since in this Modification it is not necessary for a user to be aware of the resolution of the first image, this Modification improves usability.

(7) In Embodiments 1-3, an example has been described in which, in order to generate a first image having a higher resolution than a second image, vector data representing a vector image that has been enlarged at a ratio of the resolution of the first image to the resolution of the second image is stored in the input data buffer 1006, but the present invention is not limited in this way. For example, the edge processing unit 1003 or the filling unit 1004 may generate vector data representing a vector image enlarged at the ratio of the reso-lutions, generate stencil data based on the vector data, and store the stencil data in the stencil buffer 1007.

(8) In Embodiments 1-3, the first access pattern may be set to $C1 \times 2^N$ pixels high by $C2 \times 2^K$ pixels wide (C1 and C2 are integers). In this case, if the anti-alias pattern is set to $2^M$ pixels high by $2^J$ pixels wide, the anti-alias pattern ($2^M$ pixels high by $2^J$ pixels wide) fits in the first access pattern ($C1 \times 2^N$ pixels high by $C2 \times 2^K$ pixels wide) $C1 \times 2^{N \times M}$ times in the vertical direction and $C2 \times 2^{K-J}$ times in the horizontal direction. Therefore, efficiency of access to the stencil buffer 1007 is improved.

(9) In Embodiments 1-3, an example has been described in which the user stores an anti-alias pattern in the pattern storage unit 1009 via the pattern input unit 1012, but the present invention is not limited in this way. A pattern management table T, as shown in FIG. 27, may be stored beforehand in the pattern storage unit 1009. In this case, the access pattern setting unit 1005 may refer to the pattern management table T to change the second access pattern of the frame data writing unit 1014. For example, if the first access pattern is "a block eight pixels high by eight pixels wide" and the anti-alias pattern is "four pixels high by four pixels wide", the access pattern setting unit 1005 refers to an ID corresponding to the pattern management table T and sets the second access pattern to "a block two pixels high by two pixels wide". If the first access pattern is "a block eight pixels high by eight pixels wide" and the anti-alias pattern is "four pixels high by four pixels wide", the access pattern setting unit 1005 refers to the pattern management table and sets the second access pattern to "a block two pixels high by two pixels wide".

Also, in this Modification, the pattern input unit 1012 may be a touch screen as in FIG. 28, so that a user can freely choose an ID in the pattern management table. In this case, combinations of the selection buttons displayed on the touch screen shown in FIG. 28, i.e. the selection buttons 1012a for selecting a memory bandwidth and the selection buttons 1012b for selecting an anti-alias pattern, correspond to IDs in the pattern management table T. The ID corresponding to the combination of selection buttons that the user designates is selected.

Accordingly, the user can easily adjust rendering settings via the touch screen, which improves usability of the graphics rendering device 1000.

Also, in the graphics rendering device in Embodiments 1-3, as resolution of the second image is increased, the effect of controlling aliasing increases, but since the size of frame data also increases, time is required to write the frame data in the frame buffer 1008. This ends up lowering the overall processing speed of the graphics rendering device. Conversely, as resolution of the second image is reduced, the size of frame data decreases, which shortens the time necessary for processing to write the frame data in the frame buffer 1008. While this improves the overall processing speed of the graphics rendering device, decreasing the resolution of the second image causes the effect of controlling aliasing to also decrease. In other words, improving the effect of controlling aliasing and increasing overall performance speed of the graphics rendering device are mutually exclusive.

In this Modification, on the other hand, the user can freely set the anti-alias pattern. Therefore, in accordance with the purpose for using the graphics rendering device, the user can freely choose to prioritize image quality by improving the effect of controlling aliasing, or to prioritize processing speed by increasing the overall processing speed of the graphics rendering device.

<Supplementary Explanation>

The graphics rendering device in the Embodiments is typically implemented as an LSI, which is a semiconductor integrated circuit. Elements in the graphics rendering device may be integrated as individual chips, or part of all of the elements may be integrated as one chip. While the term LSI is used above, the terms IC, system LSI, super LSI, and ultra LSI may be used, depending on the degree of integration.

Furthermore, the method of circuit integration is not limited to LSI. A dedicated circuit or a universal processor may be used to implement the graphics rendering device. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of function blocks and components may naturally be accomplished using such technology. The application of biotechnology or the like is possible.

Additionally, a rendering apparatus suitable for a variety of uses may be formed by combining a semiconductor chip on which the graphics rendering device according to the Embodiments is integrated with a display for rendering an image. In particular, since vector graphics are of great utility in rendering characters (outline fonts), the present invention can be used as an information rendering unit in a cellular phone, television, digital video recorder, digital video camera, car navigation system, etc. As the display combined with the graphics rendering device, in addition to a cathode-ray tube (CRT), a liquid crystal display, a plasma display panel (PDP), a flat display such as an organic EL display, a projection display of which a projector is representative, etc. may be used.

INDUSTRIAL APPLICABILITY

The graphics rendering device in the present invention can be used in a variety ways, for example to render vector figures, and in particular characters (outline fonts) at a high quality, with low power consumption, and rapidly. For example, the present invention is of great utility in a portable display terminal that operates on batteries, such as a cellular phone, portable music player, digital camera, digital video camera, etc. The present invention is also of utility in displaying menus in high-resolution information display devices such as a television, digital video recorder, car navigation, etc., and in displaying information in a web browser, editor, EPG, map display, etc.

REFERENCE SIGNS LIST 1000 graphics rendering device
1001 vector data input unit
1002 curve segmenting unit
1003 edge processing unit
1004 filling unit (stencil data read unit)
1005 access pattern setting unit
1006 input data buffer
1007 stencil buffer
1008 frame buffer
1009 pattern storage unit
1010 rendering unit
1012 pattern input unit
1013 frame data generation unit
1014 frame data writing unit
1015 display
T pattern management table

The invention claimed is:

1. A graphics rendering device provided with (i) stencil buffer storing stencil data including pieces of first pixel information, one for each pixel in a first image, and (ii) a frame buffer storing frame data composed of pieces of second pixel information, one for each pixel in a second image of a lower resolution than the first image, and the graphics rendering device rendering the frame data on a display, the graphics rendering device comprising:

a processor; and
a non-transitory memory having stored thereon executable instructions, which when executed by the processor cause the graphics rendering device to perform function as:
a stencil data read unit operable to access the stencil buffer one or more times to read a part of the stencil data in accordance with a first access pattern indicating pieces of first pixel information accessible by a single access to the stencil buffer;
a frame data generation unit operable to generate, from the part of the stencil data, a part of the frame data composed of a piece of second pixel information corresponding to a predetermined number of pixels in accordance with the first access pattern and an anti-alias pattern used in generating the pieces of second pixel information;
an access pattern setting unit operable to set, in accordance with the first access pattern and the anti-alias pattern, a second access pattern indicating pieces of second pixel information accessible by a single access to the frame buffer; and
a frame data writing unit operable, when the frame data generation unit has generated pieces of second pixel information as indicated by the second access pattern, to write, in the frame buffer, a part of the frame data corresponding to the pieces of second pixel information in accordance with the second access pattern.

2. The graphics rendering device of claim 1, wherein the first access pattern is A pixels in a vertical direction and B pixels in a horizontal direction, where A and B are each an integer two or greater.

3. The graphics rendering device of claim 2, wherein A is $2^N \times P$, and B is $2^K \times Q$, where N, P, K, and Q are each an integer one or greater, the anti-alias pattern is $2^M$ pixels in a vertical direction and $2^J$ pixels in a horizontal direction, where M and J are each an integer one or greater, one of M and J is two or greater, $N \geq M$, and $K \geq J$, and the second access pattern is $(2^{N-M}) \times P \times R$ pixels in a vertical direction and $(2^{K-J}) \times Q \times S$ pixels in a horizontal direction, where R and S are each an integer one or greater.

4. The graphics rendering device of claim 3, wherein P and Q are each one, and
R is one, and S is $2^{J+M}$.

5. The graphics rendering device of claim 4, wherein the access pattern setting unit sets a number of accesses to the stencil buffer for a single access to the frame buffer in accordance with the first access pattern, the anti-alias pattern, and the second access pattern.

6. The graphics rendering device of claim 5, further comprising:
a pattern storage unit storing the anti-alias pattern.

7. The graphics rendering device of claim 3, wherein P and Q are each one, and
R is $2^{M+J}$, and S is one.

8. The graphics rendering device of claim 3, wherein P, Q, R, and S are each one.

9. A graphics rendering method implemented by a computer, the graphics rendering method comprising the steps of:
- storing, in a stencil buffer, stencil data composed of pieces of first pixel information, one for each pixel in a first image;
- storing, in a frame buffer, frame data composed of pieces of second pixel information, one for each pixel in a second image of a lower resolution than the first image;
- reading, by accessing the stencil buffer one or more times, a part of the stencil data in accordance with a first access pattern indicating pieces of first pixel information accessible by a single access to the stencil buffer;
- generating, from the part of the stencil data, a part of the frame data composed of a piece of second pixel information corresponding to a predetermined number of pixels in accordance with the first access pattern and an anti-alias pattern used in generating the pieces of second pixel information;
- setting, in accordance with the first access pattern and the anti-alias pattern, a second access pattern indicating pieces of second pixel information accessible by a single access to the frame buffer;
- writing in the frame buffer, when pieces of second pixel information as indicated by the second access pattern have been generated, a part of the frame data corresponding to the pieces of second pixel information in accordance with the second access pattern; and
- rendering the frame data on a display.

10. A non-transitory computer readable recording medium having recorded thereon a graphics rendering program that causes a computer to perform graphics rendering, the graphics rendering comprising the steps of:
- storing, in a stencil buffer, stencil data composed of pieces of first pixel information, one for each pixel in a first image;
- storing, in a frame buffer, frame data composed of pieces of second pixel information, one for each pixel in a second image of a lower resolution than the first image;
- reading, by accessing the stencil buffer one or more times, a part of the stencil data in accordance with a first access pattern indicating pieces of first pixel information accessible by a single access to the stencil buffer;
- generating, from the part of the stencil data, a part of the frame data composed of a piece of second pixel information corresponding to a predetermined number of pixels in accordance with the first access pattern and an anti-alias pattern used in generating the pieces of second pixel information;
- setting, in accordance with the first access pattern and the anti-alias pattern, a second access pattern indicating pieces of second pixel information accessible by a single access to the frame buffer;
- writing in the frame buffer, when pieces of second pixel information as indicated by the second access pattern have been generated, a part of the frame data corresponding to the pieces of second pixel information in accordance with the second access pattern; and
- rendering the frame data on a display.

11. An integrated circuit for graphics rendering including (i) storing, in a stencil buffer, stencil data including pieces of first pixel information, one for each pixel in a first image, (ii) storing, in a frame buffer, frame data composed of pieces of second pixel information, one for each pixel in a second image of a lower resolution than the first image, and (iii) rendering the frame data on a display, the integrated circuit comprising:
- a processor; and
- a non-transitory memory having stored thereon executable instructions, which when executed by the processor cause the integrated circuit to perform function as:
  - a stencil data read unit operable to access the stencil buffer one or more times to read a part of the stencil data in accordance with a first access pattern indicating pieces of first pixel information accessible by a single access to the stencil buffer;
  - a frame data generation unit operable to generate, from the part of the stencil data, a part of the frame data composed of a piece of second pixel information corresponding to a predetermined number of pixels in accordance with the first access pattern and an anti-alias pattern used in generating the pieces of second pixel information;
  - an access pattern setting unit operable to set, in accordance with the first access pattern and the anti-alias pattern, a second access pattern indicating pieces of second pixel information accessible by a single access to the frame buffer; and
  - a frame data writing unit operable, when the frame data generation unit has generated pieces of second pixel information as indicated by the second access pattern, to write, in the frame buffer, a part of the frame data corresponding to the pieces of second pixel information in accordance with the second access pattern.

* * * * *